(12) United States Patent
Hayes

(10) Patent No.: US 11,061,993 B2
(45) Date of Patent: *Jul. 13, 2021

(54) APPARATUS FOR PERFORMING MODAL INTERVAL CALCULATIONS BASED ON DECORATION CONFIGURATION

(71) Applicant: Modal Technology Corporation, Minneapolis, MN (US)

(72) Inventor: Nathan T. Hayes, Minneapolis, MN (US)

(73) Assignee: Modal Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,390

(22) Filed: Mar. 9, 2020

(65) Prior Publication Data

US 2020/0210514 A1 Jul. 2, 2020

Related U.S. Application Data

(63) Continuation-in-part of application No. 16/423,924, filed on May 28, 2019, now Pat. No. 10,585,972, which is a continuation of application No. 15/939,433, filed on Mar. 29, 2018, now Pat. No. 10,318,606, which is a continuation of application No. 15/419,215, filed on Jan. 30, 2017, now Pat. No. 9,934,198, which is a continuation of application No. 14/421,272, filed as application No. PCT/US2013/055162 on Aug. 15, 2013, now Pat. No. 9,558,155.

(Continued)

(51) Int. Cl.
*G06F 17/10* (2006.01)
*G06F 7/499* (2006.01)
*G06F 7/483* (2006.01)

(52) U.S. Cl.
CPC .............. *G06F 17/10* (2013.01); *G06F 7/483* (2013.01); *G06F 7/49942* (2013.01); *G06F 7/49989* (2013.01)

(58) Field of Classification Search
CPC ...... G06F 17/10; G06F 7/483; G06F 7/49942; G06F 7/49989
USPC ........................................................ 708/200
See application file for complete search history.

(56) References Cited

U.S. PATENT DOCUMENTS 5,790,832 A 8/1998 Barbier et al.
6,094,151 A 7/2000 Schwartz et al.
(Continued)

FOREIGN PATENT DOCUMENTS

JP 2008541202 11/2008
WO 2006107996 10/2016

OTHER PUBLICATIONS

PCT/US2013/055162, International Preliminary Report on Patentability dated Feb. 17, 2015 (4 pages).

(Continued)

*Primary Examiner* — Tan V Mai
(74) *Attorney, Agent, or Firm* — Dicke, Billig & Czaja, PLLC

(57) ABSTRACT

Apparatus performs various modal interval computations, while accounting for various modal interval operand configurations that are not amenable to ordinary computational operations. Upon detecting an exponent field of all 1's, the apparatus adapts various conventions involving leading bits in the fraction field of the modal interval endpoints to return a result having a useful meaning. Unary, binary and ternary modal interval operations with decorations are contemplated.

8 Claims, 29 Drawing Sheets

Related U.S. Application Data

(60) Provisional application No. 61/683,456, filed on Aug. 15, 2012.

(56) References Cited

U.S. PATENT DOCUMENTS

| | | |
|---|---|---|
| 6,658,443 B1 | 12/2003 | Walster |
| 9,558,155 B2 | 1/2017 | Hayes |
| 2008/0263335 A1 | 10/2008 | Hayes |
| 2011/0225221 A1 | 9/2011 | Hayes |

OTHER PUBLICATIONS

PCT/US2013/055162, International Search Report and Written Opinion of the International Searching Authority dated Jan. 22, 2014 (7 pages).

EPO Appln. 13829387.3, Extended European Search Report and European Search Opinion dated Mar. 3, 2016 (6 pages).

Nathan T. Hayes: "Decorations as State Machine", Sep. 18, 2011, XP055252294, http://grouper.ieee.org/groups/1788/email/pdf38EOGnbvjb.pdf (12 pages).

M.H. van Emden: New Developments in Interval Arithmetic and Their Implications for Floating-Point Standardization, arXuvLcs. 0210015v2, dated Oct. 23, 2002 (13 pages).

Introduction to Modal Intervals; Prepared for the IEEE 1788 Working Group by Nathan T. Hayes, Sunfish Studio, LLC, Aug. 21, 2009 (61 pages).

Standard for Modal Interval Arithmetic DRAFT, Nathan T. Hayes, Feb. 4, 2013 (33 Pages).

| $(f, X)$ | $X = \varnothing$ | The restriction of $f$ on Set($X$) is... |
|---|---|---|
| EIN | T | Defined and Continuous on Empty Input |
| DAC | F | Defined and Continuous |
| DEF | F | Defined |
| GAP | F | Empty or Nonempty |
| NDF | F | Empty |

TABLE 1

| $S(f, X)$ | The restriction of $f$ on Set($X$) is... |
|---|---|
| ein | EIN |
| dac | DAC and not EIN |
| def | DEF and not DAC |
| gap | GAP and not (DEF or NDF) |
| ndf | NDF and not EIN |

TABLE 2

| $S(f, X)$ | $X = \varnothing$ | $D_f = \varnothing$ | Set($X$) $\subseteq D_f$ | Set($X$) $\cap D_f = \varnothing$ | $f$ cont. on Set($X$) |
|---|---|---|---|---|---|
| ein | T | T or F | T | T | T |
| dac | F | F | T | F | T |
| def | F | F | T | F | F |
| gap | F | F | F | F | F |
| ndf | F | T or F | F | T | F |

TABLE 3

| Bit 50 | Bit 49 | Decoration | Description |
|---|---|---|---|
| 1 | 1 | DAC | Defined and Continuous |
| 1 | 0 | DEF | Defined |
| 0 | 1 | GAP | Empty or Nonempty |
| 0 | 0 | NDF | Empty |

TABLE 4

FIG 5

APPARATUS FOR PERFORMING MODAL INTERVAL CALCULATIONS BASED ON DECORATION CONFIGURATION

This is continuation-in-part of application Ser. No. 16/423,924, filed May 28, 2019, U.S. Pat. No. 10,585,972 effective Mar. 10, 2020, which is a continuation of application Ser. No. 15/939,433 filed Mar. 29, 2018, now U.S. Pat. No. 10,318,606 which is a continuation of application Ser. No. 15/419,215, filed Jan. 30, 2017, now U.S. Pat. No. 9,934,198, which is a continuation of application Ser. No. 14/421,272, filed Feb. 12, 2015, now U.S. Pat. No. 9,558,155, which is a USC § 371 national phase entry of international application PCT/US2013/055162 filed Aug. 15, 2013, which is an international application filed under 35 § 363 claiming priority, under 35 U.S.C. § 119(e)(1), of provisional application Ser. No. 61/683,456, previously filed Aug. 15, 2012, under 35 U.S.C. § 111(b).

The present invention is generally directed to apparatus, system and/or methods of receiving computer input, performing or executing select operations upon the input and outputting a transformed input, more particularly, in the context of taking modal interval operands as inputs, performing a modal interval operation specified by a selector signal and thereafter producing a modal interval result, apparatus, system and/or methods of detecting exceptional conditions in modal interval arithmetic operations

BACKGROUND

Computer arithmetic is the practice of performing mathematical operations in a computer. Originally proposed in 1945 by John von Neumann, an arithmetic logic unit (ALU) is a digital circuit that performs integer arithmetic and logical operations. The ALU is a fundamental building block of the central processing unit of a computer. Data is provided as input to the ALU, an external control unit tells the ALU what operation to perform on that data, and then the ALU transforms the input data into an output. The input data are called the operands, and the output of the ALU is called the result. Each operation that the ALU is capable of performing may produce a different result for the same set of operands.

In modern computers, the integer operands are typically encoded into digital signals using well-known formats like two's complement or binary coded decimal. An ALU may also calculate with non-integer formats, but these types of ALU are usually given a more specific name. For example, an ALU that performs operations on floating point operands is typically called a floating point unit (FPU). In Applicant's U.S. Pat. No. 7,949,700 entitled "Modal interval Processor," incorporated herein by reference, an ALU taking modal interval operands as input, performing a modal interval operation specified by a selector signal, and then producing a modal interval result is called a modal interval processing unit (MIPU).

Regardless of the formats that any particular type of ALU may calculate with, it is common in many ALU designs to also take as input, or produce as output. A set of condition codes. These codes may be used to indicate cases such as carry-in, carry-out, zero, parity, etc. However, another common use for these codes is to indicate the presence or absence of exceptional conditions.

An exception is a particular state that may occur in an ALU when an operation is performed on a specific set of operands. For example, the IEEE Standard for Floating Point Arithmetic (IEEE Std 754-2008 In IEEE Std 754-2008, Aug. 29, 2008, pp. 1-58), incorporated herein by reference, defines exactly five (5) exceptions known as Invalid Operation, Division by Zero, Overflow, Underflow and Inexact. In the event any operation conforming to the standard reaches a state characterized by one of these five exceptional conditions, certain mechanisms are specified which allow a user to detect the exceptional condition. One mechanism specified by the standard is to require that a designated exception flag is set. Another mechanism requires the operation to encode a special non-numeric value known as a NaN (Not-a-Number) in the result. In the former case, a user may determine if an exception occurred during an operation by checking to see if the designated exception flag is set. In the latter case, the user may determine if an exception occurred by checking to see if the operation result is a NaN.

Similarly, Applicant's U.S. Pat. No. 8,204,926 entitled "Reliable and Efficient Computation of Modal Interval Arithmetic Operations," incorporated herein by reference, discloses a set of digital circuits that allow certain exceptional conditions to be detected in various modal interval arithmetic operations. If an exception is detected, methods similar to those specified in IEEE 754-2008 may allow a user to determine if an exception occurred.

The focus of the present invention is an improved system and method of detecting exceptions in modal interval arithmetic operations (which includes but is not limited to the so-called "classical" interval arithmetic, a distinction made and discussed in Applicant's previously referenced patents). As shown in Applicant's white paper entitled "Decorations as State Machine," prior art methods of detecting exceptional conditions in interval operations lack several important properties that allow a user to detect certain types of exceptions or eke have the potential to lose information about exceptions that may have occurred in prior operations. In the worst case, some prior art methods can, under certain circumstances, actually provide misleading information or even be totally incorrect. So there is still yet a need for a new and improved system and method to detect exceptional conditions in interval operations that overcome these limitations of prior art methods.

SUMMARY OF THE INVENTION

Apparatus calculates a first result modal interval dependent on a first modal interval. Each modal interval is defined by first and second endpoints. Each endpoint comprises sign, fraction and exponent bit fields.

The apparatus broadly comprises a first operand register for holding the first and second endpoints, and for providing a first operand signal specifying the contents of the first modal interval endpoints' fields.

The apparatus also includes a first analysis element that receives the first operand signal, that creates first and second truth tables dependent on the first operand signal, and that encodes the first and second truth tables in a first truth tables signal.

The apparatus further includes a first logic array receiving the first operand signal and the first truth tables signal. This first logic array provides a first "empty" bit value signal dependent on the sign, fraction, and exponent field contents of the first and second endpoints.

Lastly, in this broad version, the apparatus also includes a first computational element receiving the first operand signal and the "empty" bit value signal. The first computational element then performs a computation associated with the first computational element using the data encoded in the first operand signal and the "empty" bit value signal. The result of that computation is provided in a first result signal encoding the result of the computation by the first computational element. Such computations may include inverse, transcendental computations, squares, square roots, etc.

In a further version of this invention, the first analysis element creates the first and second truth tables dependent on a preselected exponent field bit configuration in each of the first and second endpoints, and on a preselected fraction field configuration in each of the first and second endpoints.

The broad version of the invention described above may be adapted for calculating a second result modal interval dependent on the first modal interval and on a second modal interval having the same structure as the first modal interval. This version is suitable for modal interval calculations involving two operands such as multiplication, division, adding, and subtracting.

Such a version includes a second operand register for holding the second modal interval, and for providing a second operand signal specifying the contents of the second modal interval's endpoints' fields.

This version includes a second analysis element that receives the second operand signal, that creates third and fourth truth tables dependent on the second operand signal, and that encodes the third and fourth truth tables in a second truth tables signal.

This two operand version also has a second logic array receiving the second operand signal and the second truth tables signal, and providing a second "empty" bit value signal dependent on the sign, exponent, and fraction values in the third and fourth endpoints. A third logic array receives the first and second truth tables signals and generates first and second multiplexer control signals based on the first and second truth tables signals.

This version also includes at least first and second multiplexers each having a control terminal and first and second input terminals. These first and second multiplexers receive respectively the first and second multiplexer control signals at the control terminals thereof. Each multiplexer has first and second data terminals, and each multiplexer gates data present at the one of the first and second data input terminals as selected by the multiplexer control signal to create a multiplexer output signal at an output terminal of the multiplexer involved, that encodes the bit values present at the selected input terminal.

Connections provide to the first multiplexer's first and second data terminals respectively, the values of selected bits in the first and second endpoints' fraction fields.

Other connections provide to the second multiplexer's first and second data terminals respectively the values of selected bits in the third and fourth endpoints' fraction fields.

A second computational element in this version receives the first and second operands signals, the first and second "empty" bit value signals, and the first and second multiplexer output terminal signals. The second computational element then performs a computation associated with the second computational element using the data encoded in the first and second operand signals, the "empty" bit value signals, and the first and second multiplexer output signals. The second computational element provides a second result signal encoding the second result modal interval as a result of the computation by the second computational element.

The apparatus may be further adapted to process at least one of an EIN signal and a GAP signal. Such apparatus comprises third and fourth multiplexers each with the structure of the first and second multiplexers. The third and fourth multiplexers receive the first and second multiplexers' output signals respectively at the first input terminals of the third and fourth multiplexers, and one of the EIN signal and the GAP signal at the second input terminals of the third and fourth multiplexers. The third and fourth multiplexers receive at the control terminals thereof third and fourth multiplexer control signals respectively, and provide at the respective third and fourth multiplexers' output terminals the signal at the respective input terminal specified by the control signal at the respective control terminal.

A fourth logic array receives the first and second truth tables signals and generates therefrom the third and fourth multiplexer control signals.

A further version of this apparatus comprises a comparator receiving the output signals of the first and second multiplexers at first and second input terminals respectively. The comparator provides a comparator output signal having a first value responsive to the value encoded in the first multiplexer's output signal numerically exceeding the value encoded in the second multiplexer's output signal, and a second value otherwise.

This version includes a fifth multiplexer with the structure of the first and second multiplexers. The fifth multiplexer at the first and second input terminals receives the second endpoints recorded in the first and second operand registers, and the comparator output signal at the control terminal. A sixth multiplexer also has the structure of the first and second multiplexers. The sixth multiplexer at the first and second input terminals receives the first endpoints recorded in the first and second operand registers, and the comparator output signal at the control terminal.

The second computational element includes a first sub-element providing as a result of the computation by the second computational element and responsive to a first configuration of the first and second "empty" bit value signals, the data forming the fifth and sixth multiplexer output signals as the first and second endpoints of the result modal interval encoded in the second result signal.

A second sub-element of the second computational element, as a result of the computation by the second computational element and responsive to a second configuration of the first and second "empty" bit value signals different from the first configuration thereof, provides as the second result modal interval encoded in the second result signal, the first and second endpoints recorded in the first operand register as the second and first endpoints of the second result modal interval.

A third sub-element of the second computational element, as a result of the computation by the second computational clement and responsive to a third configuration of the first and second "empty" bit value signals different from the first and second configurations thereof, provides as the second result modal interval encoded in the second result signal, the first and second endpoints recorded in the second operand register as the second and first endpoints of the second result modal interval; and A fourth sub-element of the second computational element, as a result of the computation by the second computational element and responsive to a fourth configuration of the first and second "empty" bit value signals different from the first through third configurations thereof, provides as the second result modal interval encoded in the second result signal, the results of a selected modal interval calculation.

The broad version of the invention described above may be also be adapted for calculating a third result modal interval dependent on the first modal interval, the second modal interval, and on a third modal interval having the same structure as the first and second modal intervals. This version is suitable for modal interval calculations involving three operands (i.e., ternary modal interval operations) such as a fused modal interval operation (e.g., fused multiply-add modal interval operation).

The apparatus for performing a ternary modal interval operation calculates a result modal interval dependent on a first modal interval, a second modal interval and a third modal interval is generally provided. The first modal interval is defined by a first endpoint pair, the second modal interval is defined by a second endpoint pair, the third modal interval is defined by a third endpoint pair, and the result modal interval is defined by a result endpoint pair. Each endpoint of the endpoint pair of each of the first, second, third and result modal intervals is characterized by sign, fraction, and exponent bit fields.

The apparatus is characterized by operand registers, namely, first, second and third operand registers, the registers holding endpoints of the endpoint pairs of each of the modal intervals, and for providing operand signals specifying contents of the bit fields of the endpoints of the endpoint pairs of the modal intervals.

An analysis element of the apparatus receives the operand signals and creates a first, second and third truth table pair, respectively, from the first, second and third endpoint pair, each truth table pair including a first and second truth table, respectively, for the first and second endpoint of the endpoint pair, each truth table including a sign bit (S) indicating the sign of the respective endpoint, a not-a-number bit (N) indicating whether the respective endpoint is Not-a-Number, an infinity bit (I) indicating whether the respective endpoint is infinity, and a zero bit (Z) indicating whether the respective endpoint is zero.

A classification element of the apparatus determines a first classification from the first truth table pair, a second classification from the second truth table pair, and a third classification from the third truth table pair, each classification including an empty bit (E) and a tracking decoration (T), wherein: (1) when the truth table pair indicates the respective endpoints have the same sign and magnitudes of infinity, the empty bit is 1 and the tracking decoration indicates an empty or non-empty restriction; (2) when the truth table pair indicates exactly one of the respective endpoints is not-a-number, the empty bit is 1 and the tracking decoration is the NaN decoration field from the not-a-number endpoint; (3) when the truth table pair indicates both respective endpoints are not-a-number, the empty bit is 1 and the tracking decoration indicates a select restriction; (4) or otherwise, the empty bit is 0 and the tracking decoration is not used.

Finally, a result modal signaler of the apparatus provides a result signal encoding the result modal interval. When the empty bit from the first classification is 1, the empty bit from the second classification is 1, and the empty bit from the third classification is 1, the result modal interval is a decorated empty set encoding the tracking decoration of minimum value from the first, second and third classification. When the empty bit from the first classification is 1, the empty bit from the second classification is 1, and the empty bit from the third classification is 0, the result modal interval is a decorated empty set encoding the tracking decoration of minimum value from the first and second classification. When the empty bit from the first classification is 1, the empty bit from the second classification is 0, and the empty bit from the third classification is 1, the result modal interval is a decorated empty set encoding the tracking decoration of minimum value from the first and third classification. When the empty bit from the first classification is 1, the empty bit from the second classification is 0, and the empty bit from the third classification is 0, the result modal interval is a decorated empty set encoding the tracking decoration of the first classification When the empty bit from the first classification is 0, the empty bit from the second classification is 1, and the empty bit from the third classification is 1, the result modal interval is a decorated empty set encoding the tracking decoration of minimum value from the second and third classification. When the empty bit from the first classification is 0, the empty bit from the second classification is 1, and the empty bit from the third classification is 0, the result modal interval is a decorated empty set encoding the tracking decoration of the second classification. When the empty bit from the first classification is 0, the empty bit from the second classification is 0, and the empty bit from the third classification is 1, the result modal interval is a decorated empty set encoding the tracking decoration of the third classification. When the empty bit from the first classification is 0, the empty bit from the second classification is 0, and the empty bit from the third classification is 0, the result modal interval is a result of a computation by a computational element receiving the first, second and third operand signals and the first, second and third truth table pairs.

More specific features and advantages obtained in view of the summarized features will become apparent with reference to the drawing figures and DETAILED DESCRIPTION OF THE INVENTION.

BRIEF DESCRIPTION OF THE FIGURES

FIG. 5 defines the five tracking decorations of the present invention in TABLE 1 and the five static decorations of the present invention in TABLE 2. TABLE 3 is an alternate definition of the static decorations in TABLE 2. TABLE 4 defines bit encodings of tracking decorations in a NaN decoration field of an IEEE 754-2008 binary64 datum;

DESCRIPTION OF THE INVENTION

In furtherance of disclosing important features of the contemplated invention in all forms and adaptations, and distinguishing Applicant's approach from the references of prior art, a preliminary overview of related concepts and prior art work is in order.

Natural Domains and Continuity

In the realm of pure mathematics, operations on real numbers are functions that have a natural domain. For example, the square root of a negative real number is not defined, so the natural domain of the square root operation is the set of all non-negative real numbers. Division by zero is also not defined, so the natural domain of the reciprocal operation is the set of all non-zero real numbers. And so on for each contemplated operation. In other words, whenever the input to an operation is not an element of the natural domain of the operation, the operation is not defined.

Continuity is another important property of functions of real numbers. Formal definitions of a continuous function are well-known in the prior art and can be given in terms of sequences or limits of the function. Informally, if a function is continuous then any time a sequence converges in the domain, the image of the sequence in the range also converges. In other words, one could either take the limit first, and then apply the function, or apply the function first, and then take the limits.

Even more particularly, if $f: R^n \to R$ is a function that maps n-dimensional real vectors $R^n$ to real numbers R and $D_f \subseteq R^n$ is the natural domain of $f$, then for any $X \subseteq D_f$, the property of continuity may be further defined in terms of the restriction of $f$ on X. In this case, the only relevant aspect of the continuity property is with respect to the portions of the function $f$ that are restricted to the domain X wherein X is a subset of the natural domain $D_f$ of the function.

Figure 1:
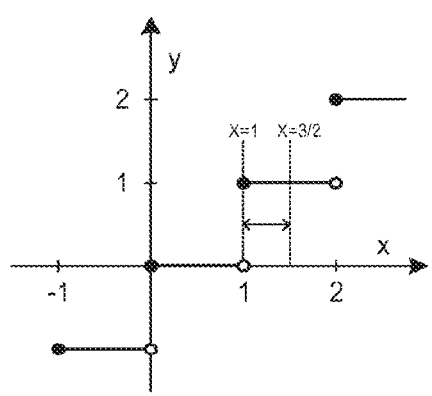
FIG. 1 depicts the natural domain of the floor function, which is the entire real number line. The function is not continuous on its natural domain, however the restriction of the function to the interval X=[1,3/2] is continuous.

For example, consider the function floor(x): $R \to R$ depicted in FIG. 1 which rounds the real number x to the closest integer n such that $n \leq x$. The floor function is defined for any real number x. So the natural domain of the function is the entire real number line. However, the function is not continuous on its natural domain. This is because, for example, if x=1 there is no sequence or limit from the left of x=1 that converges to $f(x)=1$. However, if the restriction of the floor function to the interval X=[1, 3/2] is instead considered, then the floor function is continuous on X because there is no $x \in X$ such that x<1 and this means there can be no sequence or limit from the left of x=1.

The restriction of a function to X can be continuous if and only if X is also a subset of the natural domain of the function. For example, the natural domain of the square root operation is the set of all non-negative real numbers. So the restriction of the square root operation to X=[−16, 4] cannot be continuous because there are elements of X=[−16, 4] which do not belong to the natural domain of the operation and for which the operation is not defined. In other words, X in this case is not a subset of the natural domain of the operation.

Because the empty set (Ø) is a subset of every set, it is also a subset of all natural domains of all functions. The restriction of a function to the empty set must therefore be contemplated. As it turns out, the restriction of any function to the empty set X=Ø is always defined and continuous. This is perhaps a little counterintuitive, but nonetheless mathematically correct. Formal mathematical reasoning to prove this is well known in the prior art.

Modal Intervals

The present invention is concerned with modal interval arithmetic and modal interval analysis. In particular, the present invention is concerned with an improved system and method of detecting exceptional conditions in modal interval operations. The prior notions of a real function, the natural domain of a real function, and the restriction of a real function to a subset of the natural domain of the function are therefore lifted into the topic of modal intervals.

For the purposes of the present invention, a modal interval is defined as an ordered pair [a, b] such that a and b are real numbers or signed infinities. However, the two pairs [−∞, −∞] and [+∞, +∞] are excluded. Note that no restriction $a \leq b$ is required.

The set-theoretic interpretation of a modal interval is defined as $$\text{Set}([a,b])=\{x \in R: \min(a,b) \leq x \leq \max(a,b)\},$$

and the notation $x \in [a, b]$ may be used as an abbreviation for $x \in \text{Set}([a, b])$. The empty set (Ø) is not a modal interval, however $\text{Set}(\emptyset)=\emptyset$.

A closed interval includes all of its limit points. Every modal interval [a, b] is a closed interval. If both a and b are real numbers, the modal interval is bounded. If a modal interval is not bounded, then at least one of the endpoints is −∞ or +∞ and the modal interval still contains all of its limit points but not all of its endpoints. Modal intervals of the form $$[-\infty,+\infty],[-\infty,b],[a,+\infty],[+\infty,b],[a,-\infty] \text{ and } [+\infty,-\infty]$$

are therefore understood to be unbounded. Despite the use of square brackets, infinity is never a element of any modal interval, and $$[-\infty,-\infty] \text{ and } [+\infty,+\infty]$$

are by definition not modal intervals.

A modal interval [a, b] is called proper if $a \leq b$. The modal interval is called improper if $a \geq b$. It is called a point or a point-wise modal interval if $a=b$. Note that a point-wise modal interval is also a proper and an improper modal interval at the same time.

The set of all bounded modal intervals can be visualized as points in the $R^2$ plane, where canonical abscissa and ordinate are defined respectively as the left and right bound of a modal interval [a, b], i.e., $$\lambda([a,b])=a \text{ and } \rho([a,b])=b.$$

Figure 2:
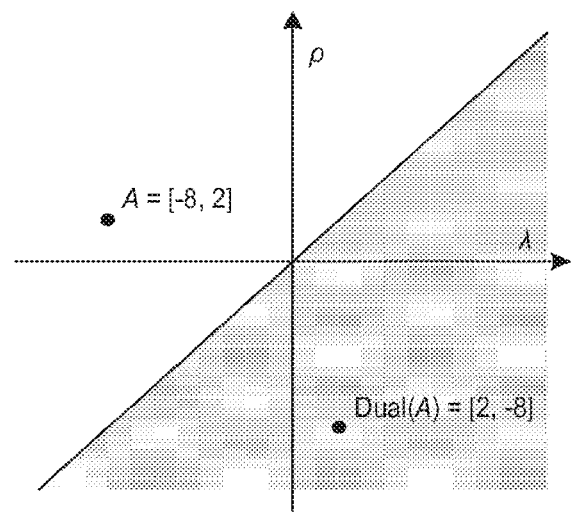
FIG. 2 is a visualization of modal intervals in the $R^2$ plane. Points above the $\lambda=\rho$ line are proper modal intervals and points below this line are improper modal intervals. Points on the line are point-wise modal intervals.

FIG. 2 is such a visualization. Points above the $\lambda=\rho$ are proper modal intervals and points below this line are improper modal intervals. Points on the line are point-wise modal intervals. It should be noted the subset of bounded modal intervals visualized in the figure is the famous set known in the prior art as the Kaucher intervals. Also, the subset of the Kaucher intervals on or above the $\lambda=\rho$ line is the famous set of "classic" intervals popularized in the late 1960's by Ramon E. Moore. The set of classic intervals do not include any improper intervals. The present invention therefore contemplates the broadest set of "intervals" as it is the only one that consists of a set wherein each element of the set may be bounded or unbounded, proper or improper.

A predicate is a Boolean function, and a proposition is a predicate wherein each variable is universally (∀) or existentially (∃) quantified. The modal quantifier Q of a modal interval [a, b] quantifies a real variable x by the definition $$Q(x,[a,b])=\text{if } a \leq b \text{ then } \forall x \in \text{Set}([a,b]) \text{ else } \exists x \in \text{Set}([a,b]).$$

The modal operators are $$\text{Dual}([a,b])=[b,a],$$

$$\text{Prop}([a,b])=[\min(a,b),\max(a,b)],$$

$$\text{Impr}([a,b])=[\max(a,b),\min(a,b)],$$

and the corresponding modal quantifiers D, E and as $$D(x,[a,b])=Q(x,\text{Dual}([a,b])),$$

$$E(x,[a,b])=Q(x,\text{Prop}([a,b])),$$

$$U(x,[a,b])=Q(x,\text{Impr}([a,b])).$$

With the modal quantifiers Q, D, E and U it is possible to form propositions with modal intervals. For example, if A and B are modal intervals then the inclusion (⊆) relation is $$A(\subseteq)B \leftrightarrow D(a,A)Q(b,B): a=b,$$

and the less-or-equal (≤) relation is $$A \leq B \leftrightarrow U(a,A)E(b,B): a \leq b \text{ and } U(b,B)E(a,A): a \leq b.$$

Figure 3:
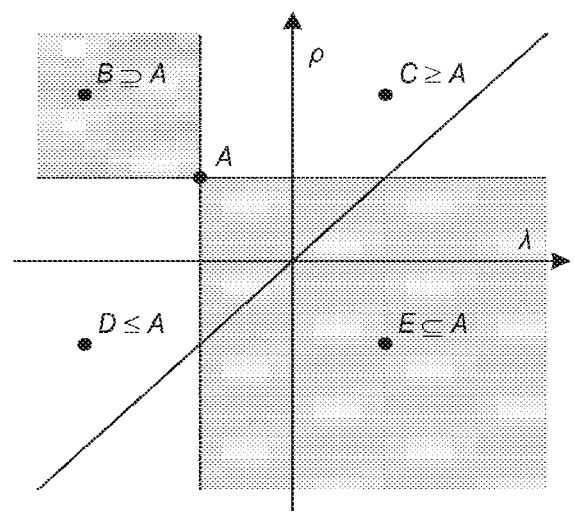
FIG. 3 is a visualization of the inclusion ($\subseteq$) and less-or-equal ($\leq$) relations for modal intervals B, C, D and E relative to modal interval A.

FIG. 3 is a geometric visualization of these modal interval relations in the $R^2$ plane. The inclusion and less-or-equal relations are shown for modal intervals B, C, D and E relative to the modal interval A.

If x is a real number, the rounding operators ∇(x) and Δ(x) are digital approximations of x such that the relations $$\nabla x \leq x \text{ and } \Delta(x) \geq x$$

are always true. For any modal interval [a, b], $$\text{Inn}([a,b])=[\Delta(a),\nabla(b)] \text{ and } \text{Out}([a,b])=[\nabla(a),\Delta(b)]$$

are the "inner" and "outer" digital roundings, respectively of [a, b].

The inner and outer digital roundings are universally possible for any digital scale and satisfy the property $$\text{Inn}([a,b]) \subseteq [a,b] \subseteq \text{Out}([a,b])$$

such that the equivalence $$\text{Inn}([a,b])=\text{Dual}(\text{Out}(\text{Dual}([a,b])))$$

makes unnecessary the implementation of the inner rounding.

Decorations and Property Tracking

A decoration is a mathematical property of a real function restricted to the domain of its modal interval inputs. Decorations provide a framework for detecting exceptional conditions such as out-of-domain arguments or non-continuous functions.

Looking at the syntactic tree for a real function, where the nodes are operators, the leaves are variables, and branches define the domain of each operator, the real function can be operationally extended to a modal interval expression by using the computational program implicitly defined by the syntactic tree of the real function. This is accomplished by transforming all of the real operators into their modal interval extension and all of the real variables into modal interval variables.

Figure 4:
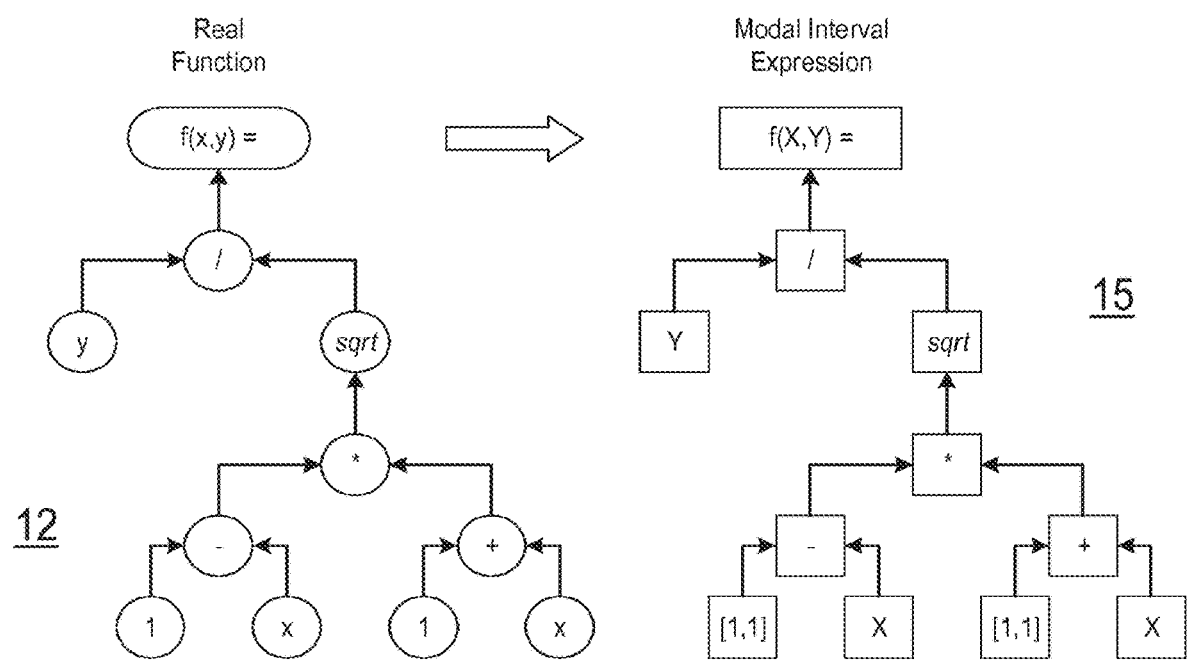
FIG. 4 depicts how the syntax tree of a real function implicitly defines a modal interval expression. Real operators are transformed into their modal interval extension and real variables into modal interval variables.

FIG. 4 is an example that shows how the syntax tree of the real function $$f(x,y)=y/\text{sqrt}((1-x)*(1+x))$$

implicitly defines a modal interval expression. Real operators and variables 12 are respectively transformed into their modal interval counterparts 15. Evaluation of the expression begins at the leafs of the tree, where variables arc propagated up the branches to the operations. The operations accept the variables as operands, perform an operation and generate a result. The result of each operation is then propagated up the branches into other operations until all nodes in the tree have been evaluated and a final result is propagated to the root of the tree.

The present invention makes a distinction between two types of decorations. A static decoration is the absolute mathematical truth about the restriction of an individual operation to the domain of its modal interval inputs. A tracking decoration, on the other hand, is a mathematical implication that is obtained for a modal interval expression by propagating static decorations in the expression tree up the branches and to the root. The method used to propagate static decorations through an expression tree in order to obtain a tracking decoration is called property tracking.

TABLE 1 in FIG. 5 defines the five (5) tracking decorations E IN, DAC, DE F, GA P and N DF of the present invention. If $f:R^n \to R$ is a real function and X is an n-dimensional modal interval box, each tracking decoration is a set whose elements are the $(f,X)$ pairs which satisfy the stated mathematical property about the restriction of $f$ on Set(X). Furthermore, whenever X is the empty set the $(f,X)$ pair is an element of EIN, otherwise the $(f,X)$ pair must be an element of another decoration.

Figure 6:
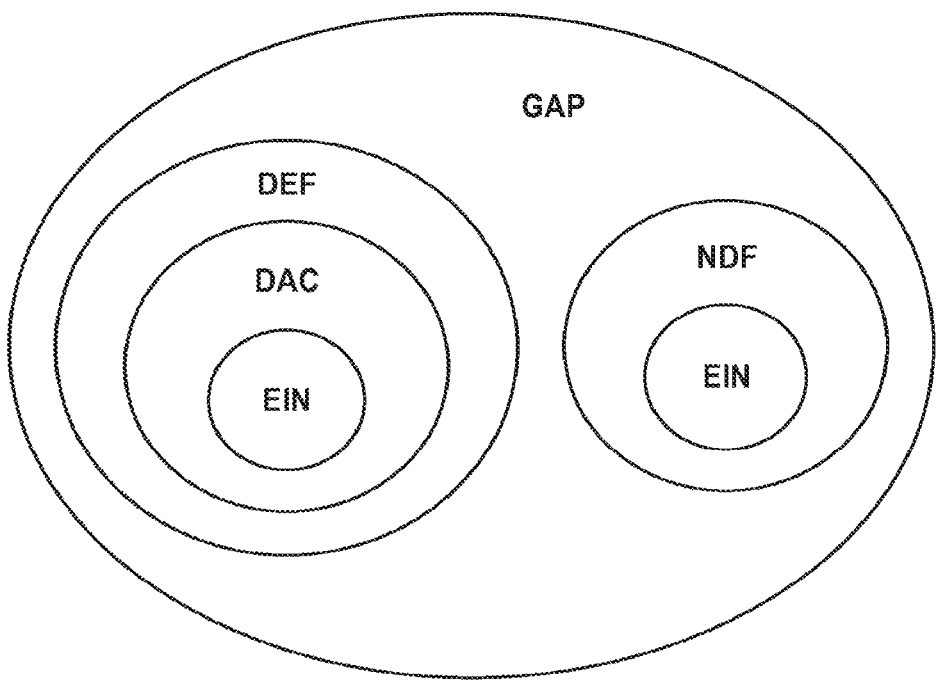
FIG. 6 is a Venn diagram showing the logical relations between the five sets of tracking decorations of the present invention.

FIG. 6 is a Venn diagram showing the logical relations between the five sets of tracking decorations. The five tracking decorations form the inclusion relations $$EIN \subseteq DAC \subseteq DEF \subseteq GAP \supseteq NDF \supseteq FEIN$$

Note that EIN is a subset of all tracking decorations and GAP is a superset of all tracking decorations.

For example, if $f$ is the square root operator and $X=[1, 4]$ then for this particular $(f,X)$ pair the restriction of $f$ on X is defined and continuous. Since X is not empty, the $(f,X)$ pair cannot be an element of EIN. Additionally, the $(f,X)$ pair cannot be an element of NDF because in this case $f(X)$ is not empty, either. However, if X is the empty set then the $(f,X)$ pair is an element of EIN, and since EIN is a subset of all tracking decorations the $(f,X)$ pair is also an element of DAC, DEF, GAP and NDF.

An important note should be made regarding the prior art as it pertains to decorations. A draft of the IEEE Standard for Interval Arithmetic contains a decoration system that was at least partially conceived by the applicant of the present invention. That decoration system has some common characteristics to the decoration system of the present invention, such as DEF and DAC decorations. However, there are some important differences, namely the absence of an EIN decoration as well as the inclusion of several other decorations not defined in the present invention such as ILL (ill-formed), COM (a common interval) and BND (a bounded interval). Applicant's white paper entitled "Decorations as State Machine" provides rationale why these competing decoration systems are unnecessary or insufficient for reliable interval computations and how the unique decoration system of the present invention overcomes those issues.

TABLE 2 in FIG. 5 presents the five (5) static decorations ein, dac, def, gap and ndf of the present invention. Note that static decorations have the same names as tracking decorations, but the tracking decorations are uppercase and the static decorations are lowercase.

For any $(f,X)$ pair, the notation $S(f,X)$ indicates which static decoration the $(f,X)$ pair is an element of as a function of TABLE 2. If $f$ has n operands, the notation $S(f,X)$ is shorthand for $S(f, X_1, X_2, \ldots, X_n)$.

If $f: R^n \to R$ is a real function and $D_f \subseteq R^n$ is the natural domain of $f$, and if X is an n-dimensional modal interval box, then TABLE 3 in FIG. 5 is an alternate definition of $S(f,X)$ that defines the same sets as TABLE 2 in FIG. 5.

Figure 7:
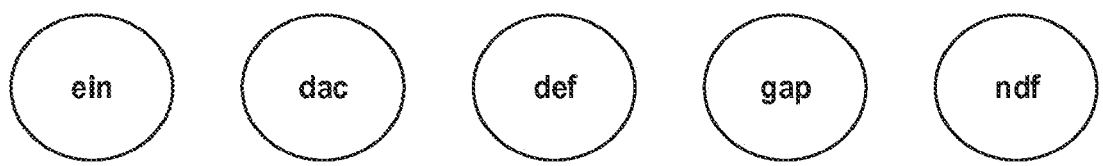
FIG. 7 is a Venn diagram showing the logical relations between the five sets of static decorations of the present invention.

FIG. 7 is a Venn diagram showing the logical relations between the five sets of static decorations. While the tracking decorations in TABLE 1 of FIG. 5 partition the universe of all $(f,X)$ pairs into a hierarchical arrangement of nested sets (c. f. FIG. 6), the static decorations in TABLES 2-3 of FIG. 5 partition the universe of all $(f,X)$ pairs into five disjoint sets (c. f. FIG. 7).

For example, if $f$ is the square root operation and $X_1=[2, 4]$, $X_2=[-1, 1]$ and $X_3=[-4, -2]$ then $S(f,X)=$dac because Set($X_1$) is a nonempty subset of $D_f$ and the restriction of $f$ on $X_1$ is continuous; $S(f, X_2)=$gap because Set($X_2$) is not a subset of $D_f$ but the intersection of Set($X_2$) and $D_f$ is nonempty; and $S(f, X_3)=$ndf because $X_3$ is not empty but the intersection of Set($X_3$) and $Df$ is empty.

Property tracking is the method used to propagate static decorations through an expression tree in order to obtain a tracking decoration. To facilitate this method, the notion of a decorated interval is contemplated. A decorated interval is a pair (X, D) that consists of a modal interval X and a tracking decoration D. The empty set is not an interval, however the notion of a decorated empty set (Ø, D) is also contemplated.

The method of property tracking begins with initialization. Each modal interval variable $X_1, X_2, \ldots, Xn$ in the leafs of the expression tree is promoted to a decorated interval $(X_1, DAC), (X_2, DAC), \ldots, (X_n, DAC)$. If any variable in a leaf of the expression tree is an empty set, then the empty variable is promoted to a decorated empty set (Ø, EIN). Similarly, if any variable in a leaf of the expression tree is $[+\infty, +\infty]$ or $[-\infty, -\infty]$, then the variable is promoted, respectively, to $$([+\infty,+\infty],GAP) \text{ or } ([-\infty,-\infty],GAP).$$

The decorated variables are then propagated up the branches of the expression tree to the operations. The operations accept the decorated variables as operands, perform an operation and generate a decorated result. For each operation, if $f: R^n \to R$ is the real function and $$(X_i,D_i)=((X_1,D_1),(X_2,D_2),\ldots,(X_n,D_n))$$

are the decorated interval operands of $f$, then the decorated result of the operation has the tracking decoration $$T(f,(X,D_i))=\min\{S(f,X_1,X_2,\ldots,X_n),D_1,D_2,\ldots,D_n\}.$$

In other words, the decorated result of the operation has a tracking decoration which is the minimum element of a set formed by the union of the static decoration $S(f, X_1, X_2, \ldots, X_n)$ of the operation and the decorations $D_1, D_2, \ldots, D_n$ of the operands.

For the sake of determining the minimum element of a set of decorations, the decorations are linearly ordered $$k \text{ ndf}/NDF < gap/GAP < def/DEF < dac/DA < ein/EIN$$

The decorated result of each operation is then propagated up the branches into other operations. The procedure is repeated until all nodes in the tree have been evaluated and a final decorated result is propagated to the root of the tree.

Digital Encodings of Modal Intervals and Decorations

Inside a computer, the endpoints of a modal interval may be represented by elements of a digital scale. In a preferred embodiment of the present invention, the digital scale conforms to the binary64 interchange format encoding of IEEE 754-2008. For the sake of discourse, only the binary64 encoding will be explained or considered in the rest of this document. However, the use of other digital scales or interchange format encodings as it pertains to the present invention should be obvious.

Figure 8:
FIG. 8 depicts an IEEE 754-2008 interchange encoding for a binary64 datum. The NaN decoration field in bits 49 and 50 is not part of the IEEE 754-2008 standard and is defined solely for the sake of the present invention.

A binary64 floating-point datum is 64 bits of information partitioned into sign, exponent and fraction fields as shown in register 20 of FIG. 8. The fraction field is in bits 0 to 51; the exponent field is in bits 52 to 62; and the sign field is the most significant bit 63. The floating-point data represented by this encoding is:

Zero. If the exponent and fraction are zero, then the floating-point data is a positive or negative zero +0 or −0 when the sign bit is 0 or 1, respectively.

Non-zero finite number. If the exponent and fraction are not zero and the exponent bits are not all 1, then by definition the floating-point data is a positive or negative non-zero finite number when the sign bit is 0 or 1, respectively.

Infinity. If the exponent bits are all set to 1 and the fraction is zero, then the floating-point data is +∞ or −∞ when the sign bit is 0 or 1, respectively. The infinities are the maximum numbers that can be represented in floating-point format. Negative infinity is less than any finite number and positive infinity is greater than any finite number.

NaN (Not-a-Number). If the exponent bits are all set to 1 and the fraction is not zero, then the floating-point data is a non-number that lies outside the range of representable floating-point numbers, regardless of the sign bit. If bit 51 is set to 1, then the NaN is quiet (QNaN); otherwise the NaN is signaling (SNaN). For the purposes of the present invention, bits 49 to 50 are the NaN decoration field. The NaN decoration field is not part of the IEEE 754-2008 standard and is defined solely for the sake of the present invention.

Figure 9:
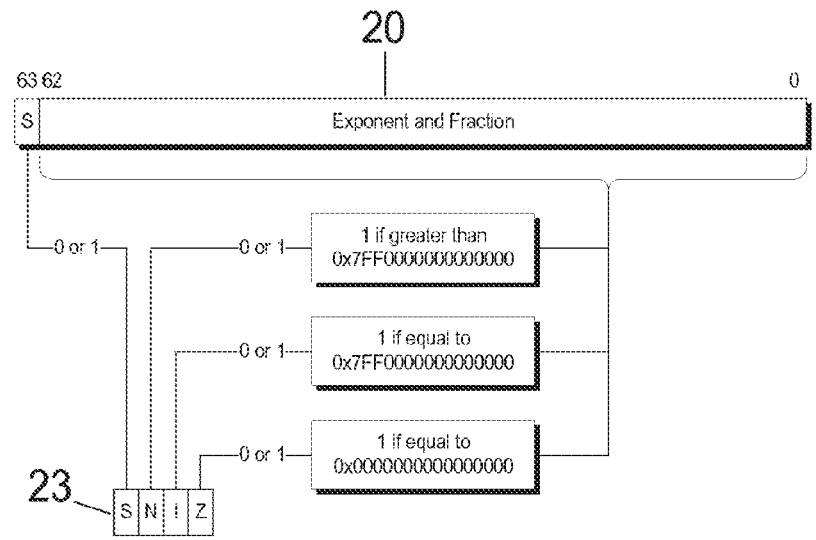
FIG. 9 is a logic diagram that defines a truth table consisting of Sign (S), NaN (N), Infinity (T) and Zero (Z) classification bits for a binary64 datum.

A binary64 datum may be associated with a truth table 23 consisting of a set of classification bits as depicted in FIG. 9. The classification bits consist of a Sign (S), NaN (N), Infinity (I) and Zero (Z) bit. Bit 63 of the binary 64 datum is copied to the Sign bit. The NaN, infinity and Zero bits are set to 0 or 1 depending on the combined value of the exponent and fraction of the binary 64 datum. If the combined value is greater than 0x7FF0000000000000, then the NaN bit is set to 1; if the combined value is equal to 0x1FF0000000000000, then the infinity bit is set to 1; if the combined value is equal to zero, then the Zero bit is set to 1; otherwise the respective NaN, Infinity and Zero bits are set to 0 and the binary64 datum is a positive or negative non-zero finite number.

If x is a floating-point datum, then S(x), N(x), I(x) and Z(x) are notations used in this document to represent the respective values of the Sign, NaN, Infinity and Zero classification bits of truth table 23.

If bit 51 of a NaN is set to 1, then the NaN is quiet (QNaN); otherwise the NaN is signaling (SNaN). If the NaN is signaling, at least one other fraction bit of the NaN must be set to 1 to distinguish the NaN from an infinity. The difference between a quiet and signaling NaN is for the sake of compatibility with IEEE 754-2008 standard interchange for encoding. However, the present invention does not require signaling NaN operations.

Bits 0 to 50 are the NaN "payload." All bits of the payload may be set to any value so long as the entire fraction field of a NaN does not become zero. The preferred embodiment of the present invention may use bits 49 to 50 of a NaN payload as a NaN decoration field to encode a representation of a tracking decoration.

If x is a NaN, then T(x) is the representation of a tracking decoration encoded within the NaN decoration field of x as depicted in TABLE 4 of FIG. 5. The tracking decoration E IN has no designated encoding within the NaN decoration field. The reason for this will be shown in the following parts of the document.

If n is the representation of a tracking decoration, then NaN(n), QNaN(n) and SNaN(n) are notations used in this document to represent the respective encodings of a NaN, quiet NaN or signaling NaN when the bits of the decoration field are set to the corresponding value of n as depicted in TABLE 4 of FIG. 5.

Figure 10:
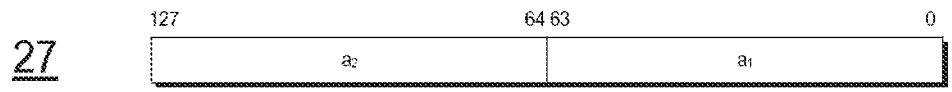
FIG. 10 depicts a modal interval datum $[a_1, a_2]$, which is encoded into 128 bits as two binary64 datums $a_1$ and $a_2$.

A modal interval datum [$a_1$, $a_2$] may be encoded into 128 bits as two binary64 datums $a_1$ and $a_2$ as illustrated in register 27 of FIG. 10. If $a_1$ or $a_2$ is a NaN, or if $a_1$ and $a_2$ are infinities with the same sign, then the 128-bit encoding represents non-interval data.

All non-interval data is an encoding of a decorated empty set.

If $a_1$ and $a_2$ are binary64 datums that do not represent a NaN, and if n is a representation of one of the tracking decorations DAC, DE F, GAP or N DF (see TABLE 1 in FIG. 5) encoded in a NaN decoration field as depicted in TABLE 4 of FIG. 5, then a decorated empty set (Ø, n) is encoded by any non-interval data of the form

[$a_1$,NaN(n)] or [NaN(n),$a_2$].

Any such encoding of a decorated empty set (Ø, n) may be provided as input to an operation of the present invention, and a canonical encoding

[+0,QNaN(n)] or [QNaN(n),+0]

may be provided as a result of an operation which produces a decorated empty set as output. Non-interval data of the form

[NaN,NaN]

is an encoding of the decorated empty set (Ø, EIN), and non-interval data of the form

[−∞,−∞] or [+∞,+∞]

is an encoding of the decorated empty set (Ø, GAP).

Figure 11:
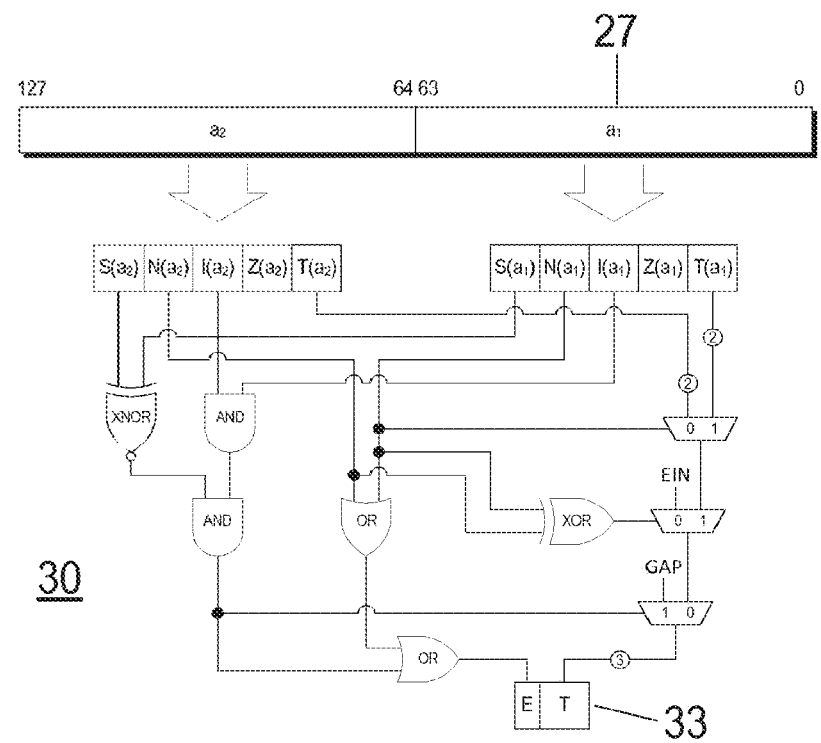
FIG. 11 is a logic diagram that defines the Empty (E) bit and Tracking Decoration (T) of a modal interval datum.

FIG. 11 shows how a modal interval datum [$a_1$, $a_2$] is classified by an Empty (E) bit and a representation of a Tracking Decoration (T). The classification 33 is a function of truth tables each consisting of the Sign (S), NaN (N) and Infinity (I) bits, respectively, of the binary64 datums $a_1$ and $a_2$, as well as the respective NaN decoration field of $a_1$ or $a_2$, if either $a_1$ or $a_2$ is a NaN. The logic diagram 30 computes the classification 33 according to the following specifications.

The Empty bit in FIG. 11 is set to 1 if $a_1$ and $a_2$ are both infinities with the same sign or if $a_1$ or $a_2$ is a NaN; otherwise the Empty bit is set to 0. If $a_1$ and $a_2$ are infinities with the same sign, the Tracking Decoration is GAP; if $a_1$ is a NaN and w is not, the Tracking Decoration is a representation of the NaN decoration field from $a_1$; if $a_2$ is a NaN and $a_1$ is not, the Tracking Decoration is a representation of the NaN decoration field from $a_2$; otherwise the Tracking Decoration is EIN. Strictly speaking, the Tracking Decoration has no meaning unless the Empty bit is set to 1. If the Empty bit is 0, the modal interval datum is a bounded or unbounded modal interval and the Tracking Decoration is not used.

If [$a_1$, $a_2$] is a modal interval datum, then E($a_1$, $a_2$) and T($a_1$, $a_2$) are notations used in this document to represent the respective values of the Empty bit and the Tracking Decoration.

Modal Interval Operations with Decorations

The present invention provides an improved system and method for reliable and efficient modal interval operations using decorations. The preferred embodiment of the present invention is an arithmetic functional unit (AFU) as disclosed in Applicant's U.S. Pat. No. 7,949,700 entitled "Modal interval Processor." Modal interval operand and result signals for the AFU are digitally, encoded using the methods described in the previous section of this document entitled "Digital Encodings of Modal Intervals and Decorations."

As will be shown subsequently for select modal interval operations, the result of a modal interval operation is typically obtained by performing a floating-point calculation on select endpoints of the modal interval operands. Because floating-point calculations are often inexact, the present invention requires the rounding operators ∇(x) and Δ(x) to ensure modal interval results obey the "outer" digital rounding of modal intervals.

Figure 12:
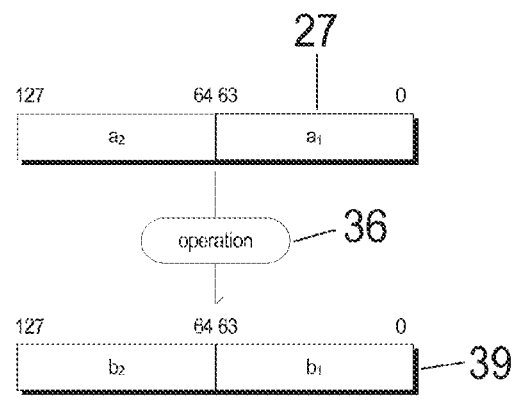
FIG. 12 depicts a unary modal interval operation, which takes an operand $[a_1, a_2]$ as input and produces a result $[b_1, b_2]$.

FIG. 12 shows a unary modal interval operation for example computes in a functional element 36. Element 36 may comprise one or more sub-elements and may be implemented as hardware, firmware or software. Element 36 takes an operand $[a_1, a_2]$ held in register 27 as input and produces a result $[b_1, b_2]$ held in a result register 39.

Figure 13:
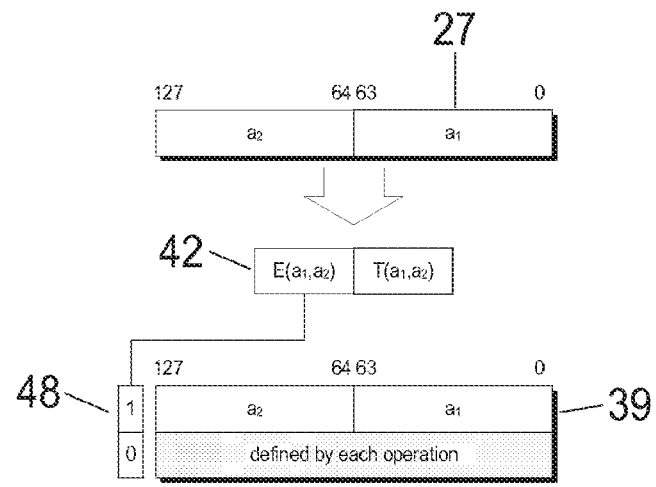
FIG. 13 is a logic diagram for a unary modal interval operation using decorations.

FIG. 13 is a more detailed logic diagram of FIG. 12. A truth table 48 specifies the value in result register 39. The truth table is a function of the Empty (E) bit 42 associated with operand 27. A truth table value of 0 selects the computation function associated with the particular operation. The other truth table value specifies the result 39 is a copy of operand 27. Therefore, if [a1, m] is an encoding of non-interval data, i.e., if $[a_1, a_2]$ is an encoding of a decorated empty set, then the operand [a1, a1] is the result of the operation. Otherwise $[a_1, a_2]$ is an encoding of a bounded or unbounded modal interval and the result is defined separately for each operation.

FIGS. 14-24 depict the result of several unary modal interval operations after a determination has been made that the operand $[a_1, a_2]$ in FIG. 13 is an encoding of a bounded or unbounded modal interval.

Figure 14:
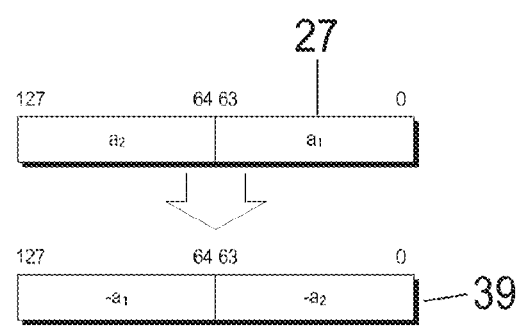
FIG. 14 is a logic diagram for a modal interval negation operation.

FIG. 14 is a logic diagram for a modal interval negation operation. The operation effectively multiplies the modal interval by −1. Since negation of floating-point numbers is exact, the modal interval negation operation is exact and requires no rounding operators.

Figure 15:
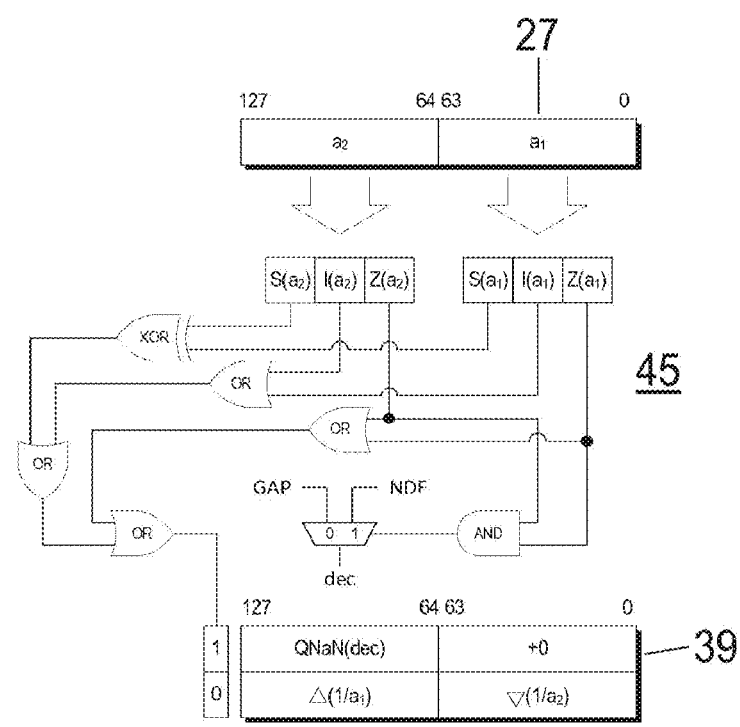
FIG. 15 is a logic diagram for a modal interval reciprocal operation.

FIG. 15 is a logic diagram for a modal interval reciprocal operation. The operation is defined if and only if $a_1$ and $a_2$ are both non-zero numbers with the same sign, otherwise the result of the operation is a decorated empty set. If $a_1$ and $a_2$ are both zero, the empty set is decorated with NDF; otherwise the empty set is decorated with GAP.

Figure 16:
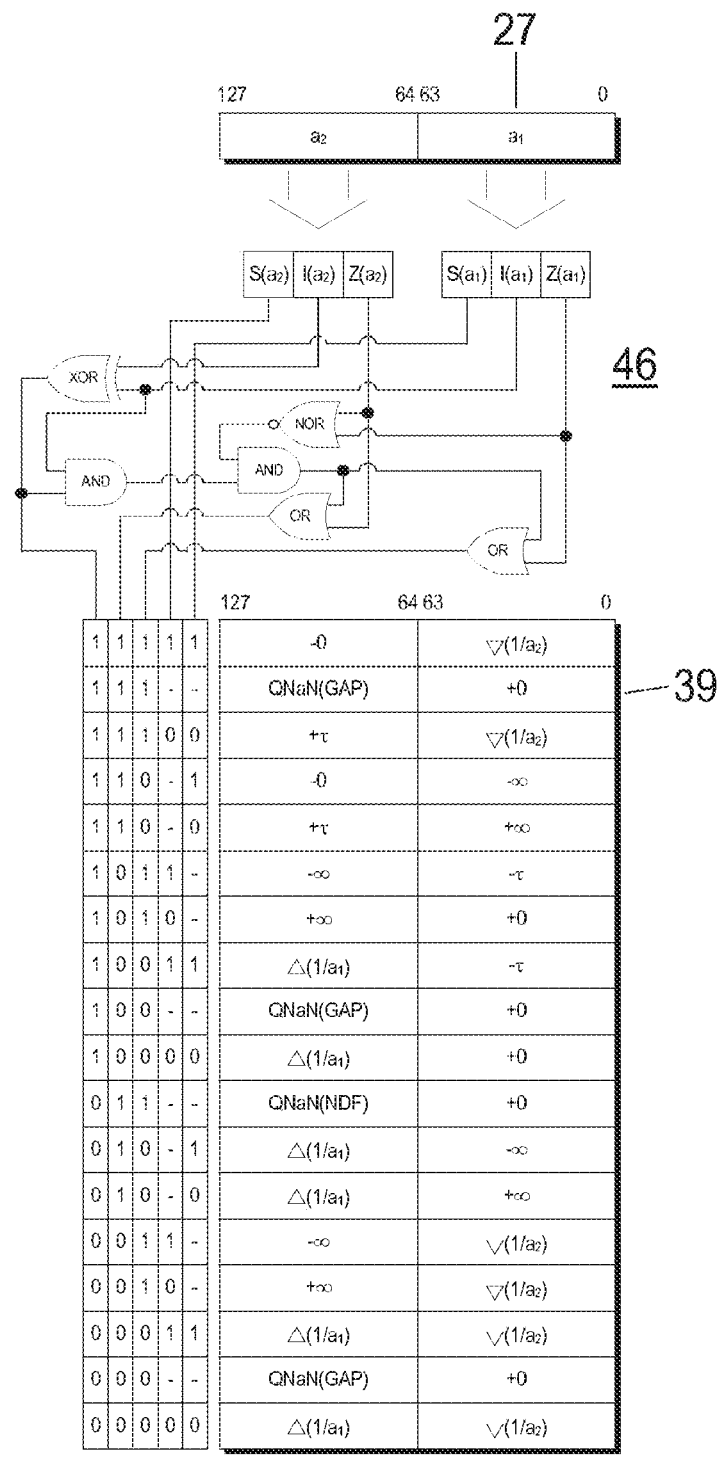
FIG. 16 is a logic diagram for a restricted modal interval reciprocal operation.

FIG. 16 is a logic diagram for a restricted modal interval reciprocal operation. The operation silently removes zero from the input of the operation. Unlike the modal interval reciprocal operation in FIG. 15, the operand $[a_1, a_2]$ may have one endpoint that is zero.

Figure 17:
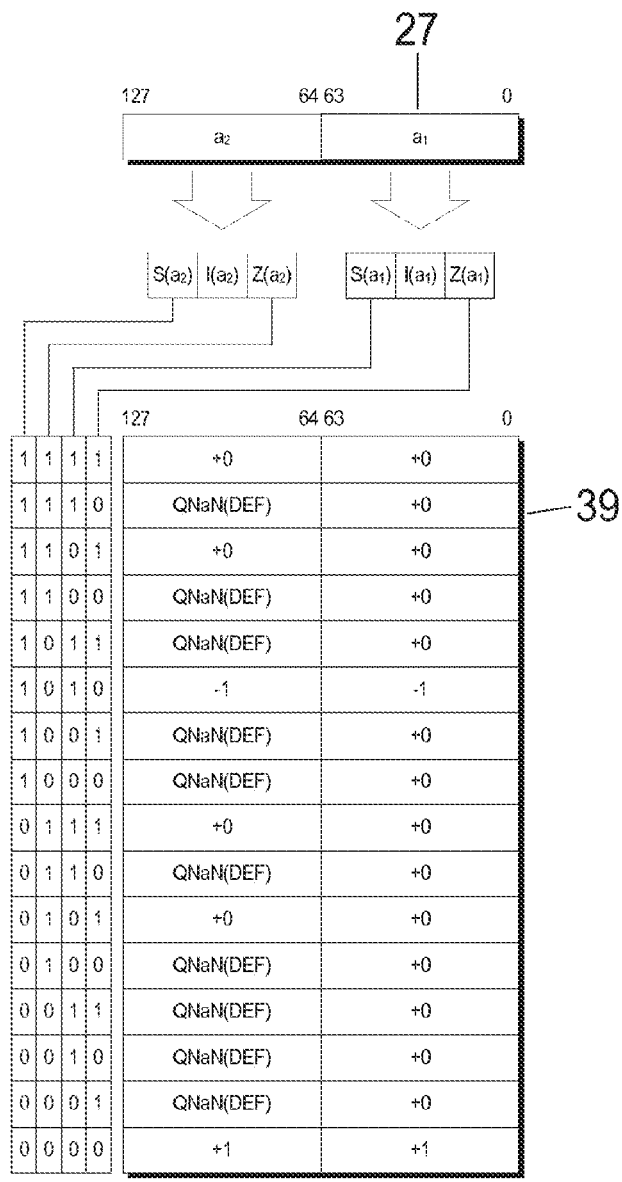
FIG. 17 is a logic diagram for a modal interval sign operation.

FIG. 17 is a logic diagram for a modal interval sign operation. The operation is defined for the entire real number line. However, the operation is continuous if and only if $a_1$ and $a_2$ are both strictly positive, both strictly negative or both zero. If the operation is not continuous, the result is an encoding of the decorated empty set (Ø, DEF).

Figure 18:
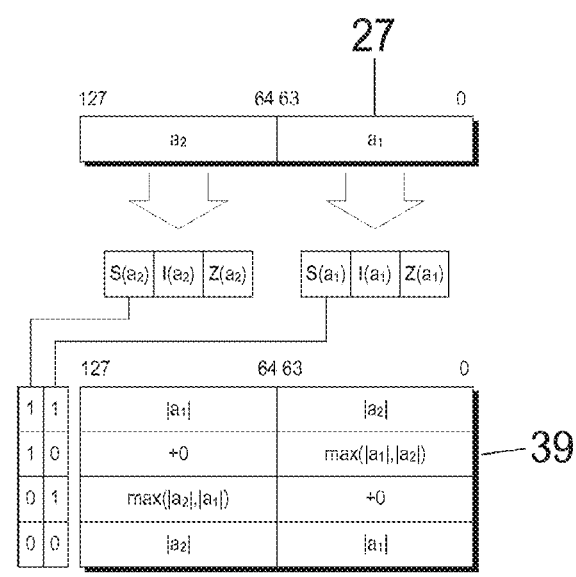
FIG. 18 is a logic diagram for a modal interval absolute value operation.

FIG. 18 is a logic diagram for a modal interval absolute value operation. Since absolute value of a floating-point number $a_1$ or $a_2$ is exact, the modal interval absolute value operation is exact and requires no rounding operators.

Figure 19:
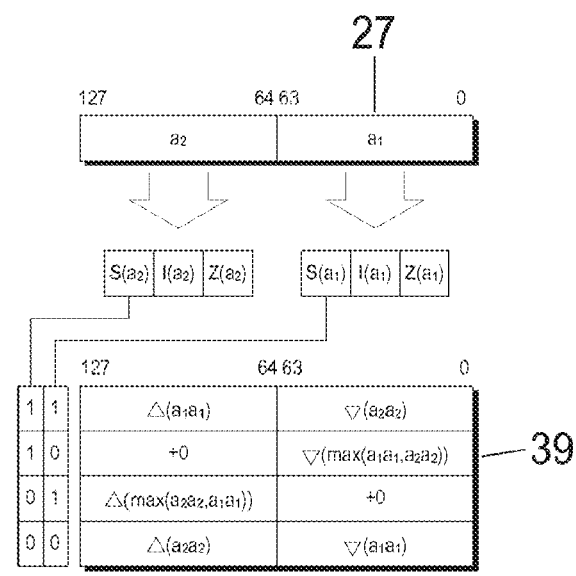
FIG. 19 is a logic diagram for a modal interval square operation.

FIG. 19 is a logic diagram for a modal interval square operation.

Figure 20:
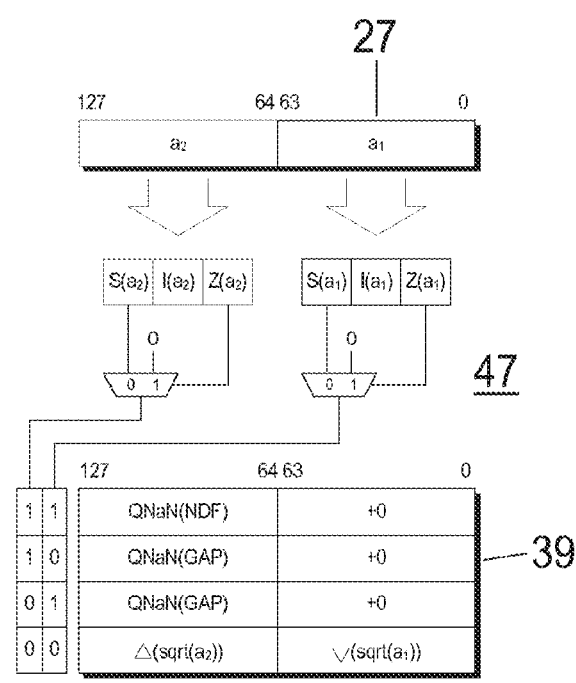
FIG. 20 is a logic diagram for a modal interval square root operation.

FIG. 20 is a logic diagram for a modal interval square root operation. The operation is not defined if $a_1$ or $a_2$ is a negative non-zero number. In conformance to the IEEE 754-2008 standard, this allows −0 to be an element of the natural domain of the operation. If $a_1$ or $a_2$ is a negative non-zero number, the result of the operation is a decorated empty set. If $a_1$ and $a_2$ are both negative non-zero numbers, the empty set is decorated with NDF; otherwise the empty set is decorated with GAP.

Figure 21:
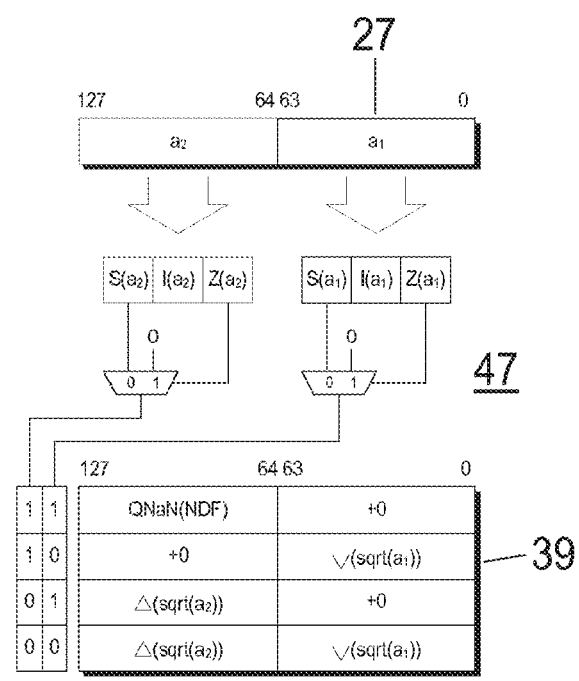
FIG. 21 is a logic diagram for a restricted modal interval square root operation.

FIG. 21 is a logic diagram for a restricted modal interval square root operation. The operation silently removes negative non-zero numbers from the input of the operation. Unlike the modal interval square root operation in FIG. 20, the operand $[a_1, a_2]$ may have one negative non-zero number as an endpoint, so long as $a_1$ and $a_2$ are not both negative non-zero numbers.

Figure 22:
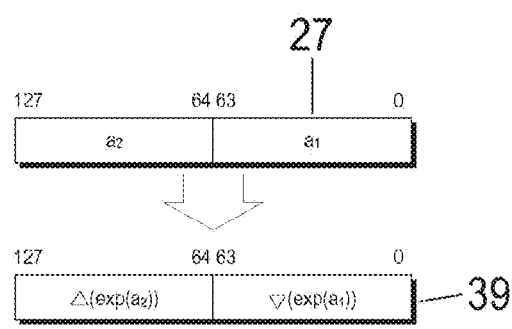
FIG. 22 is a logic diagram for a modal interval exponential operation.

FIG. 22 is a logic diagram for a modal interval exponential operation.

Figure 23:
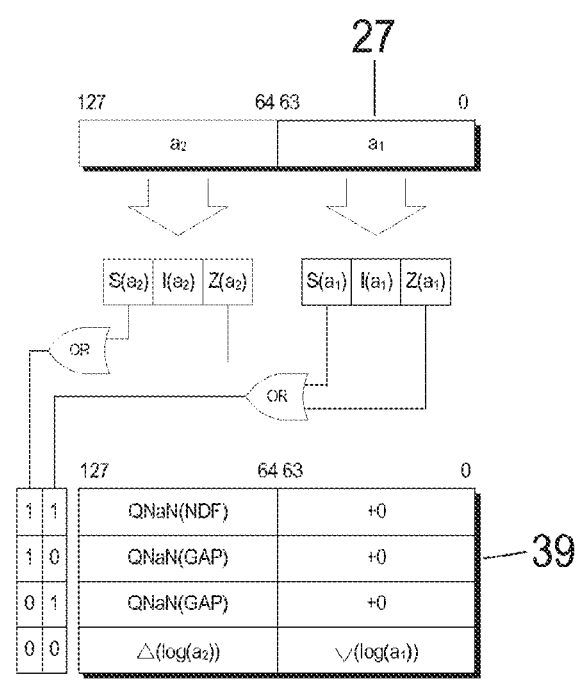
FIG. 23 is a logic diagram for a modal interval logarithm operation.
Figure 24:
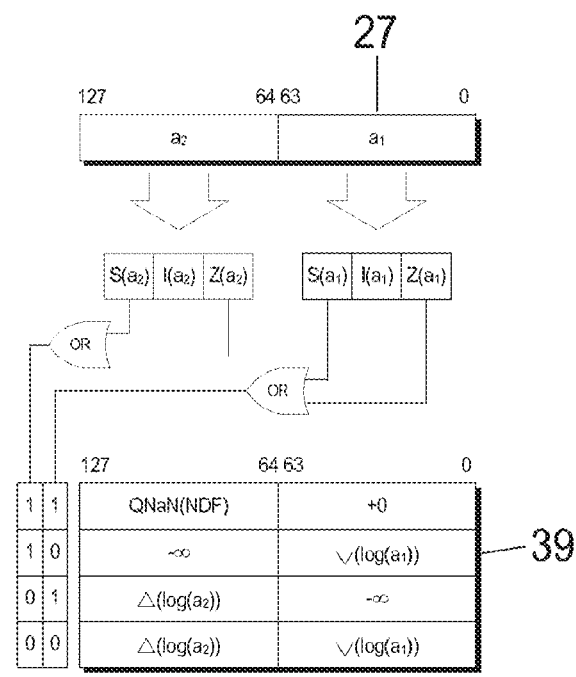
FIG. 24 is a logic diagram for a restricted modal interval logarithm operation.

FIG. 23 is a logic diagram for a modal interval logarithm operation. The operation is defined if and only if $a_1$ and $a_2$ are both non-zero positive numbers. If $a_1$ or $a_2$ is less-or-equal to zero, the result of the operation is a decorated empty set. If $a_1$ and $a_2$ are both less-or-equal to zero, the empty set is decorated with NDF; otherwise the empty set is decorated with GAR FIG. 24 is a logic diagram for a restricted modal interval logarithm operation. The operation silently removes negative numbers and zero from the input of the operation. Unlike the modal interval logarithm operation in FIG. 23, the operand $[a_1, a_2]$ may have one endpoint less-or-equal to zero, as long as $a_1$ and in are not both less-or-equal to zero.

Figure 25:
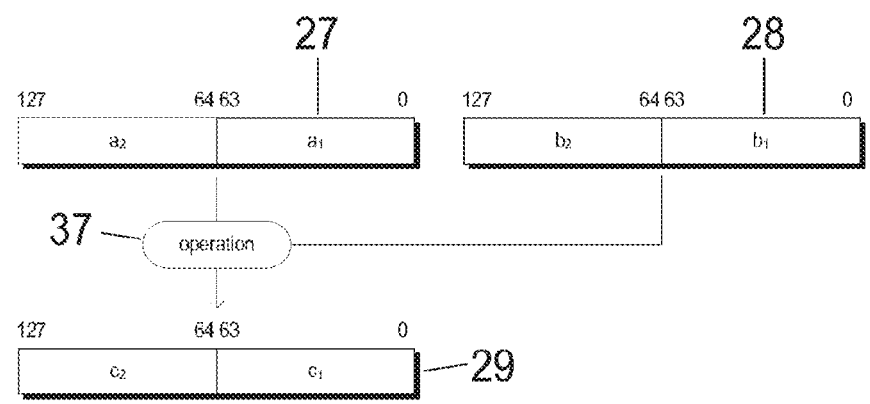
FIG. 25 depicts a binary modal interval operation, which takes operands $[a_1, a_2]$ and $[b_1, b_2]$ as input, and produces a result $[c_1, c_2]$.

FIG. 25 shows a binary modal interval operation for example computes in a functional element 37. Element 37 may comprise one or more sub-elements and may be implemented as hardware, firmware or software. Element 37 takes operands $[a_1, a_2]$ and $[b_1, b_2]$ held respectively in registers 27 and 28 as input and produces a result $[c_1, c_2]$ held in a result register 29.

Figure 26:
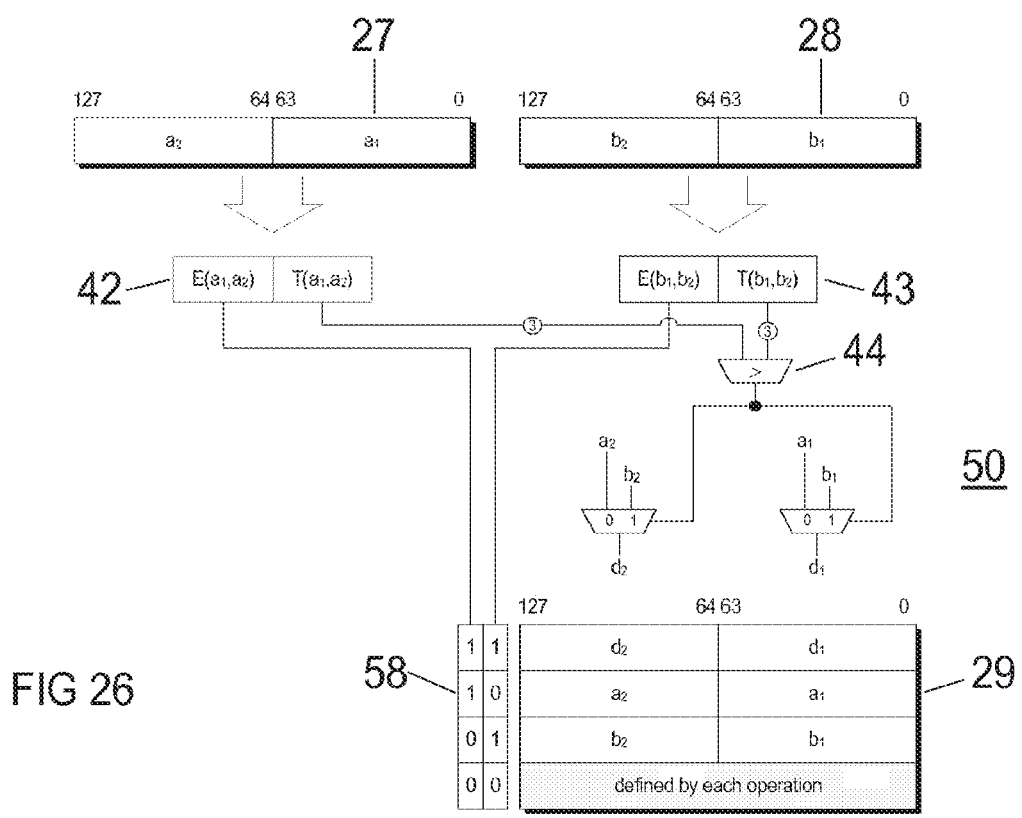
FIG. 26 is a logic diagram for a binary modal interval operation using decorations.

FIG. 26 is a more detailed logic diagram of FIG. 25. A comparator 44 receives the tracking decoration bits derived from the operands 27 and 28 and then provides a 1 output when the three tracking bits T(a1, a2) are numerically larger than the three tracking bits $T(b_1, b_2)$, and a 0 output otherwise. Logic elements 50 produce a truth table 58 that specifies the value in result register 29. A truth table value of 0 0 selects the computation function associated with the particular operation. A truth table value of 1 1 selects a value $[d_1, d_2]$ produced by multiplexing operands 27 and 28 based on the output of comparator 44. The other truth table values specify the result defined for that truth table value. The logic elements 50 are a function of the Empty (E) bit and Tracking Decoration (T) pairs 42 and 43 associated respectively with operands 27 and 28. If $[a_1, a_2]$ or $[b_1, b_2]$ is an encoding of non-interval data, i.e., if $[a_1, a_2]$ or $[b_1, b_2]$ is an encoding of a decorated empty set, the result of the operation is one of the operands $[a_1, a_2]$ or $[b_1, b_2]$. If both operands are decorated empty sets, then the operand with the minimum Tracking Decoration is the result, taking care to return operand $[a_1, a_2]$ in the event both operands are decorated empty, sets with the same Tracking Decoration; if only one operand is a decorated empty set, then the operand which is the decorated empty set is the result of the operation; otherwise $[a_1, a_2]$ and $[b_1, b_2]$ are both encodings of a bounded or unbounded modal interval and the result is defined differently for each operation.

FIGS. 27-34 depict the result of several binary modal interval operations after a determination has been made that the operands $[a_1, a_2]$ and $[b_1, b_2]$ in FIG. 26 are both encodings of a bounded or unbounded modal interval.

Figure 27:
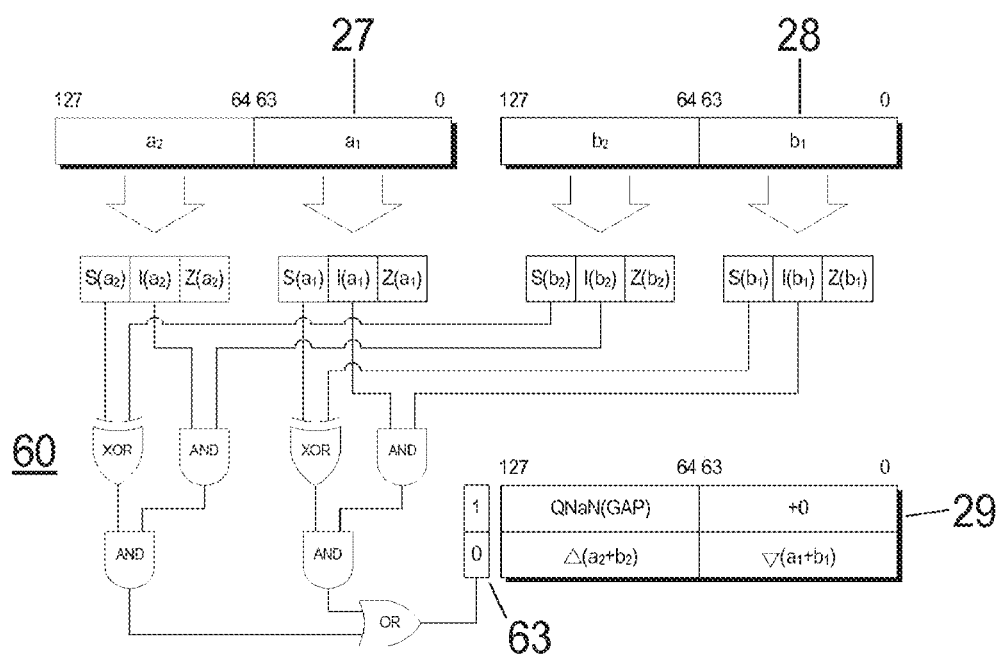
FIG. 27 is a logic diagram for a modal interval addition operation.

FIG. 27 is a logic diagram for a binary modal interval addition operation. The operation is not defined if $a_1+b_1$ or $a_2+b_2$ is a sum of infinities of opposite sign or if the sums $a_1+b_1$ and $a_2+b_2$ are infinities of the same sign. If the operation is not defined, the result is an encoding of the decorated empty set (Ø, GAP).

Figure 28:
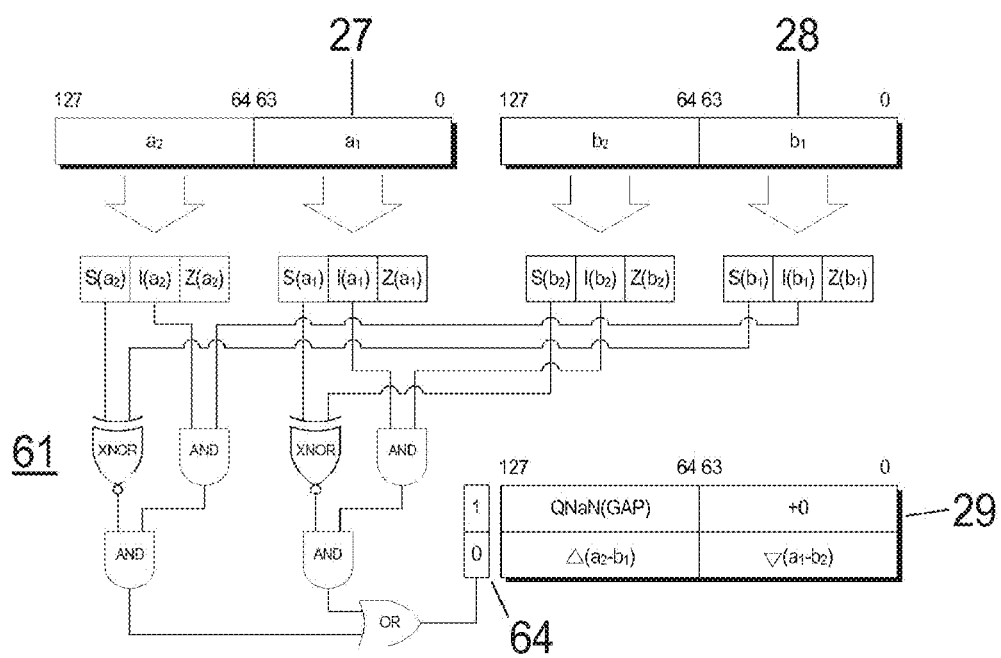
FIG. 28 is a logic diagram for a modal interval subtraction operation.

FIG. 28 is a logic diagram for a binary modal interval subtraction operation. The operation is not defined if $a_1-b_2$ or $a_2-b_1$ is a difference of infinities of the same sign or if the differences $a_1-b_2$ and $a_2-b_1$ are infinities of the same sign. If the operation is not defined, the result is an encoding of the decorated empty set (Ø, GAP).

Figure 29:
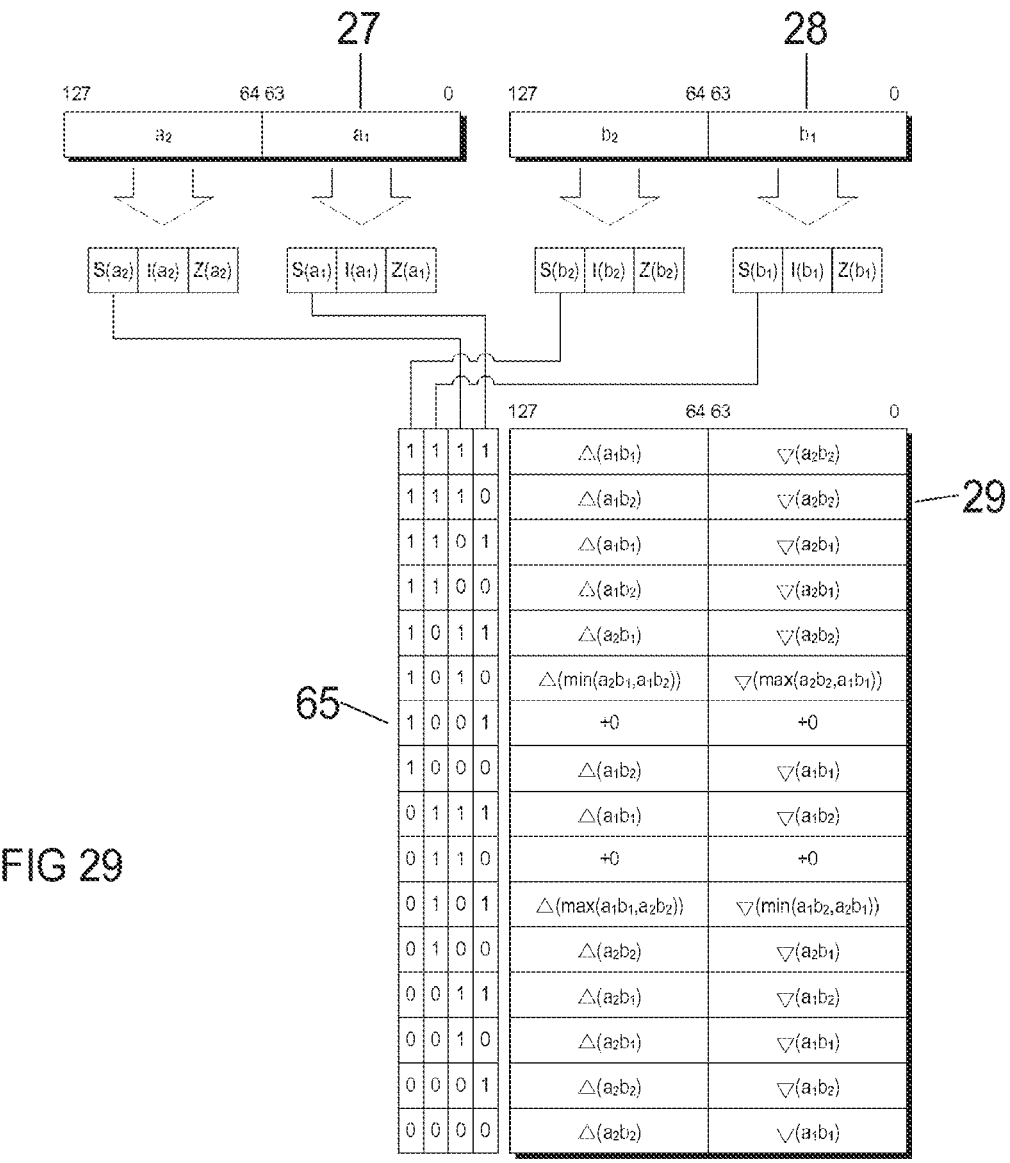
FIG. 29 is a logic diagram for a modal interval multiplication operation.

FIG. 29 is a logic diagram for a binary modal interval multiplication operation. If $a_1, a_2, b_1$ or $b_2$ is an infinity or a zero, the result of the operation may require a floating-point multiplication of an infinity and a zero. According to the IEEE 754-2008 standard, a floating-point multiplication of an infinity and a zero is an undefined operation and may return a NaN. The modal interval multiplication operation deviates from this convention and instead defines the floating-point multiplication of an infinity and a zero to be $$(-\infty)(-0)=(-0)(-\infty)=+0$$

$$(-\infty)(+0)=(+0)(-\infty)=-0$$

$$(+\infty)(-0)=(-0)(+\infty)=-0$$

$$(+\infty)(+0)=(+0)=+0$$

according to Applicant's U.S. Pat. No. 8,204,926 entitled "Reliable and Efficient Modal interval Arithmetic Operations." The modal interval multiplication operation is therefore always defined so long as the operands $[a_1, a_2]$ and $[b_1, b_2]$ are bounded or unbounded modal intervals.

Figure 30:
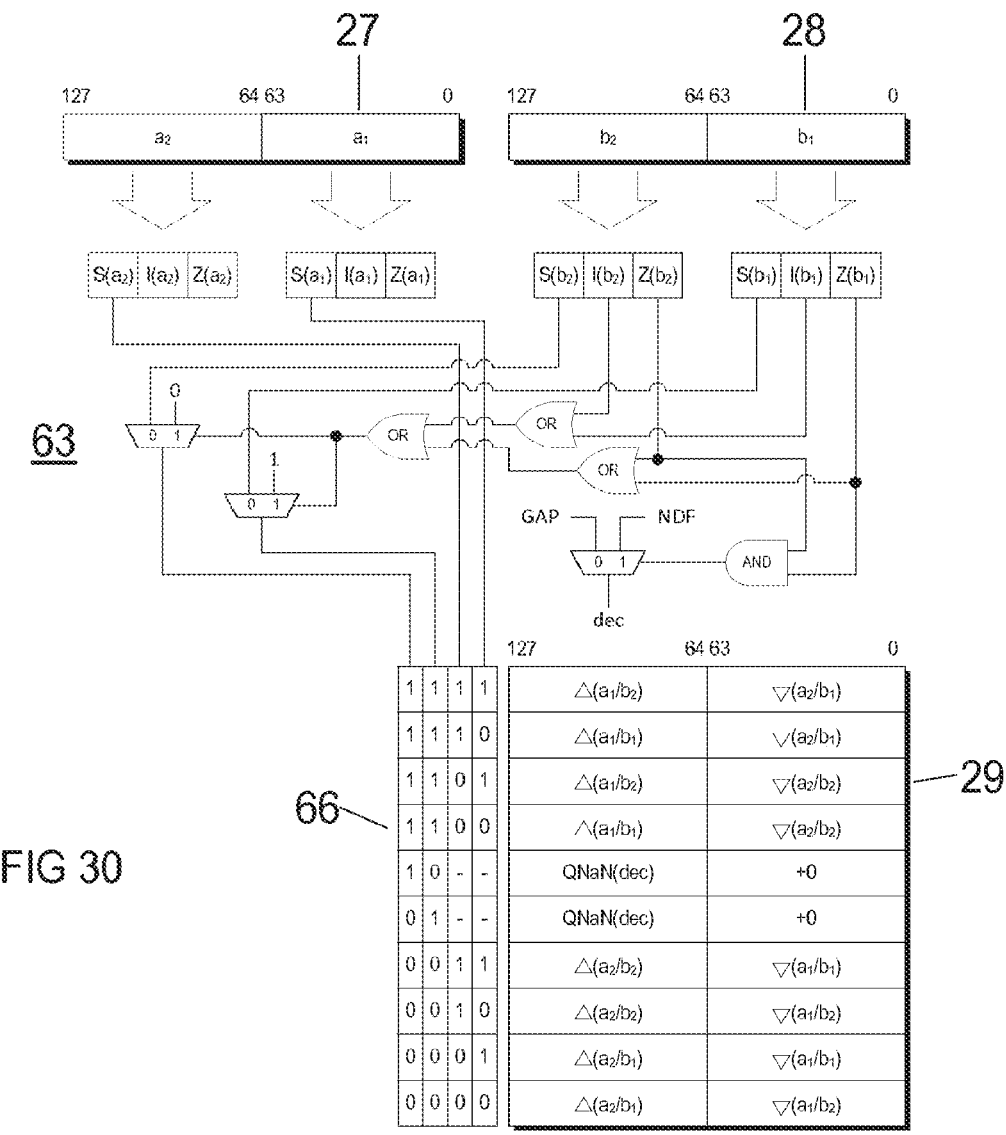
FIG. 30 is a logic diagram for a modal interval division operation.
Figure 31:
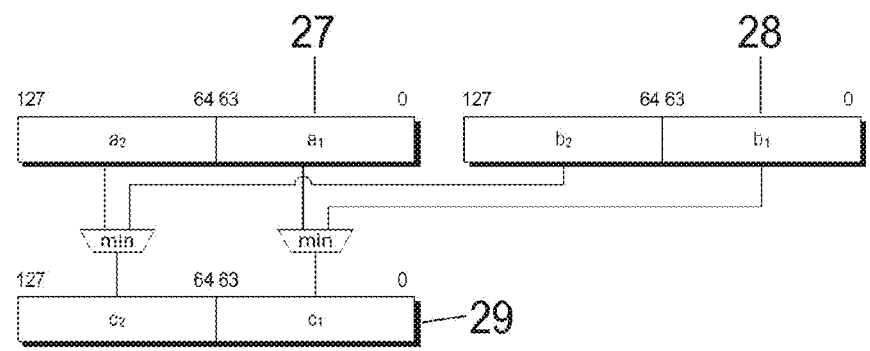
FIG. 31 is a logic diagram for a modal interval minimum operation.
Figure 32:
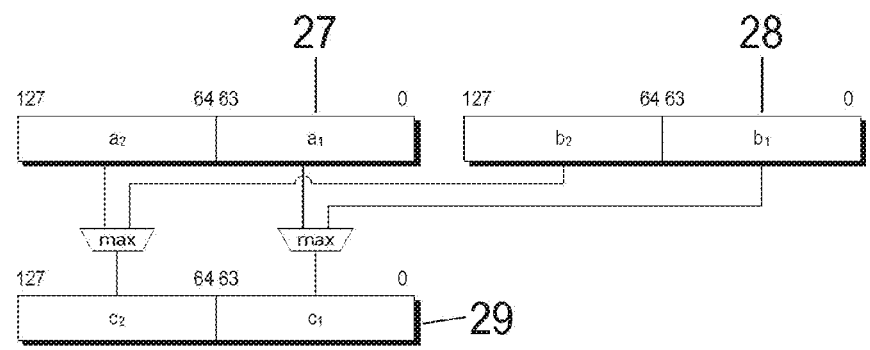
FIG. 32 is a logic diagram for a modal interval maximum operation.
Figure 33:
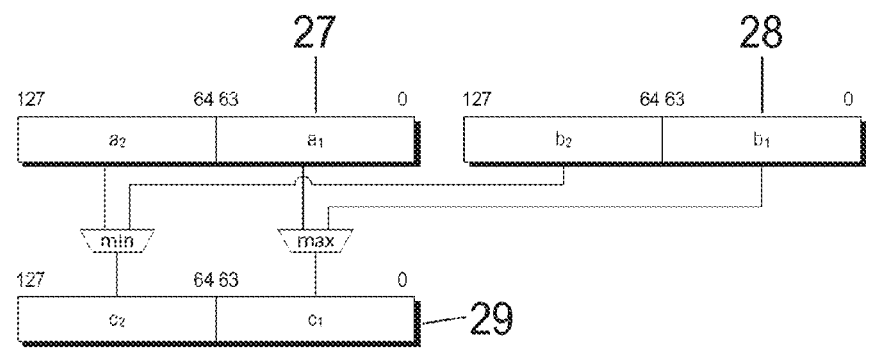
FIG. 33 is a logic diagram for a modal interval meet operation.
Figure 34:
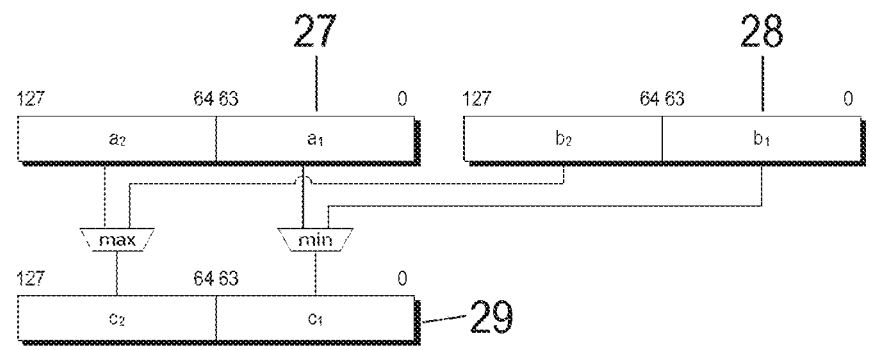
FIG. 34 is a logic diagram for a modal interval join operation.

FIG. 30 is a logic diagram for a binary modal interval division operation.

FIGS. 31-34 are logic diagrams, respectively, for the binary modal interval lattice operations minimum, maximum, meet and join. Since the minimum and maximum of floating-point numbers is exact, all of the lattice operations are exact and require no rounding operators. It is possible the minimum and maximum operations may produce a result which is a representation of the decorated empty set (Ø, GAP), encoded as $[-\infty, -\infty]$ for the minimum operation and $[+\infty, +\infty]$ for the maximum operation.

While unary and binary modal interval operations using decorations have been disclosed, there is utility and advantages to ternary interval operations, namely, ternary interval operations using decorations. Via the contemplated, non-limiting approach hereinafter described in connection to FIGS. 35 & 36, such operations are effectuated.

Figure 35:
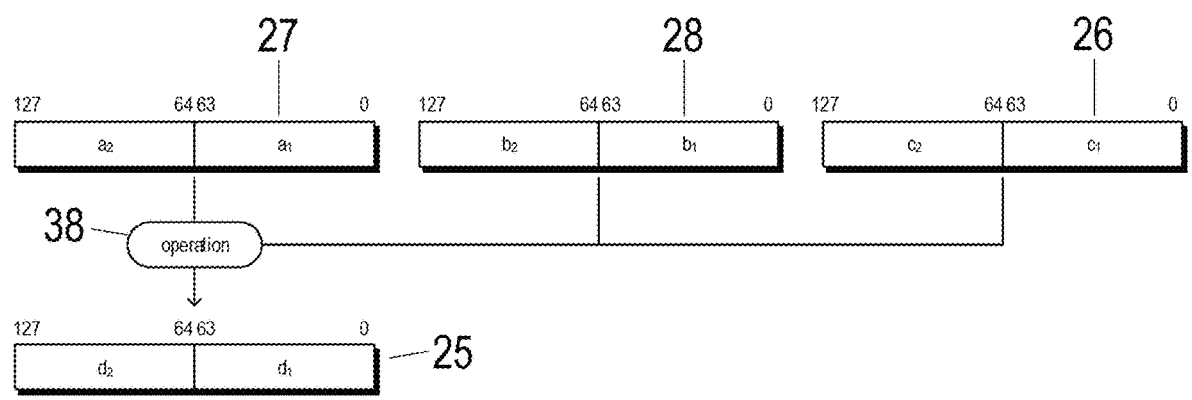
FIG. 35 depicts a ternary modal interval operation, which takes operands $[a_1, a_2]$, $[b_1, b_2]$ and $[c_1, c_2]$ as input, and produces a result $[d_1, d_2]$; and, FIG. 36 is a logic diagram for a ternary modal interval operation using decorations.

FIG. 35 schematically illustrates a ternary modal interval operation with computations executed by functional element 38. Element 38 may comprise one or more sub-elements and may be implemented as hardware, firmware or software. Element 38 takes operands $[a_1, a_2]$, $[b_1, b_2]$ and $[c_1, c_2]$ held respectively in registers 27, 28 and 26 as input, and produces a result $[d_1, d_2]$ held in a result register 25.

Figure 36:
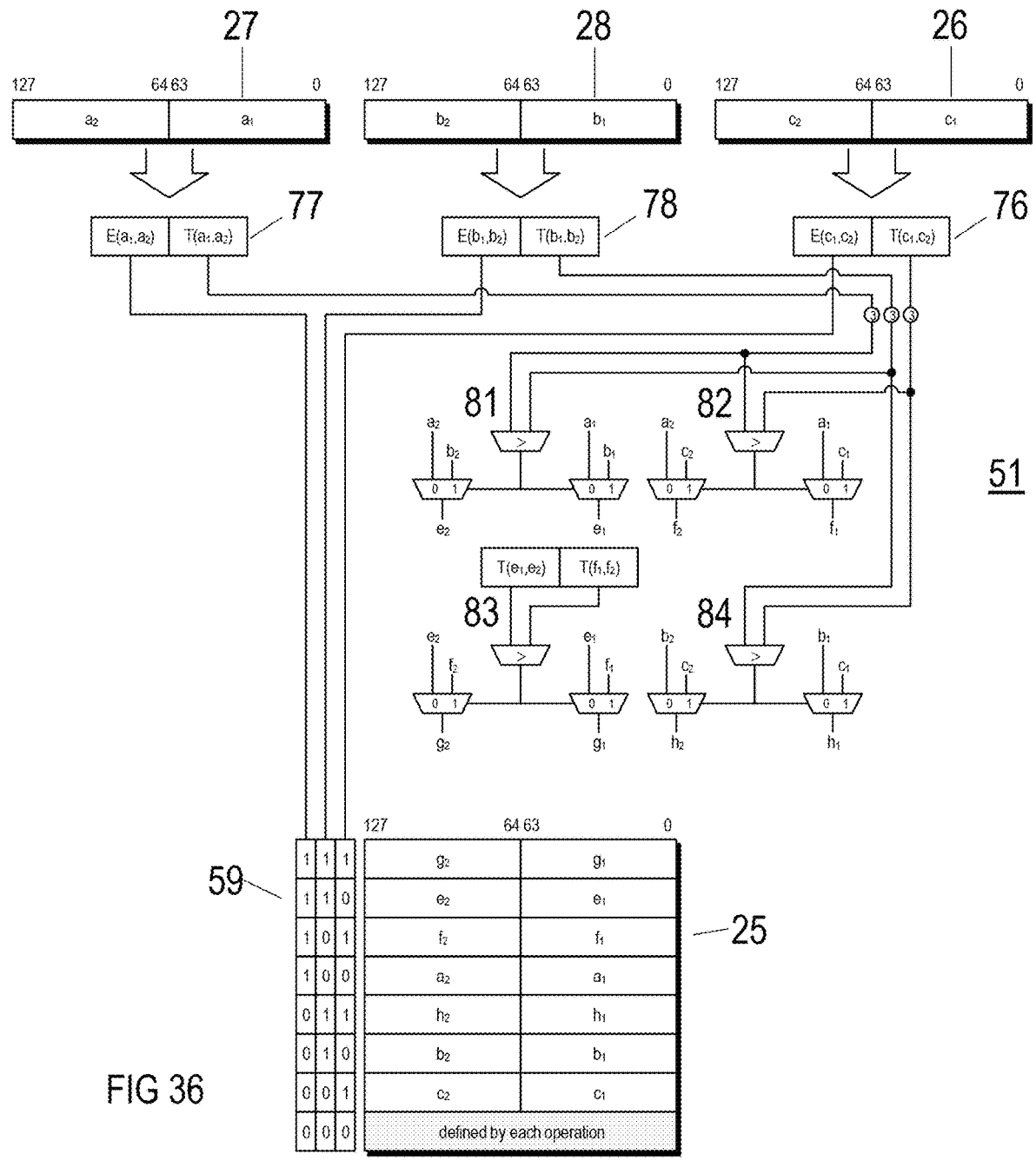

FIG. 36 is a logic diagram of the FIG. 35 operation, more particularly, the functional element 38. Comparators 81, 82, 83 and 84 receive tracking decoration bits derived from the operands 27, 28 and 26 as illustrated in FIG. 36. Comparator 81 provides a 1 output when the three tracking bits $T(a_1, a_2)$ are numerically larger than the three tracking bits $T(b_1, b_2)$, and a 0 output otherwise. Comparator 82 provides a 1 output when the three tracking bits $T(a_1, a_2)$ are numerically larger than the three tracking bits $T(c_1, c_2)$, and a 0 output otherwise. Comparator 84 provides a 1 output when the three tracking bits $T(b_1, b_2)$ are numerically larger than the three tracking bits $T(c_1, c_2)$, and a 0 output otherwise.

Logic elements 51 produce a truth table 59 that specifies the value in result register 25. A truth table value of 0 0 0 selects the computation function associated with the particular or select operation. A truth table value of 1 1 0 selects a value $[e_1, e_2]$ produced by multiplexing operands 27 and 28 based on the output of comparator 81. A truth table value of 1 0 1 selects a value $[f_1, f_2]$ produced by multiplexing operands 27 and 26 based on the output of comparator 82. Comparator 83 provides a 1 output when the three tracking bits $T(e_1, e_2)$ are numerically larger than the three tracking bits $T(f_1, f_2)$, and a 0 output otherwise. A truth table value of 1 1 1 selects a value $[g_1, g_2]$ produced by multiplexing $[e_1, e_2]$ and $[f_1, f_2]$ based on the output of comparator 83. A truth table value of 0 1 1 selects a value $[h_1, h_2]$ produced by multiplexing operands 28 and 26 based on the output of comparator 84. The other truth table values specify the result defined for that truth table value.

The logic elements 51 consider the Empty (E) bit and Tracking Decoration (T) pairs 77, 78 and 76 associated respectively with operands 27, 28 and 26. If $[a_1, a_2]$, $[b_1, b_2]$ or $[c_1, c_2]$ is an encoding of non-interval data, i.e., if $[a_1, a_2]$, $[b_1, b_2]$ or $[c_1, c_2]$ is an encoding of a decorated empty set, the result of the operation is one of the operands $[a_1, a_2]$, $[b_1, b_2]$ or $[c_1, c_2]$. If two or three of the operands are decorated empty sets, then the operand with the minimum Tracking Decoration is the result, taking care to return the left-most operand in the case when the operands are decorated empty sets with the same Tracking Decoration, wherein $[a_1, a_2]$ and $[b_1, b_2]$ are left of $[c_1, c_2]$, and $[a_1, a_2]$ is left of $[b_1, b_2]$; if only one operand is a decorated empty set, then the operand which is the decorated empty set is the result of the operation; otherwise $[a_1, a_2]$, $[b_1, b_2]$ and $[c_1, c_2]$ are all encodings of bounded or unbounded modal intervals and the result is defined differently for each operation.

Contemplated ternary operations advantageously, but not exclusively include, fused multiply-add and fused multiply-subtract, wherein select two operands of the ternary operation are multiplied (c. f, FIG. 29) into a product, and the remaining third operand is added (c. f, FIG. 27) or subtracted (c. f., FIG. 28) from the product; or the product may be subtracted from the remaining third operand (fused subtract-multiply). Fusing the multiplication with an addition (or subtraction) into a single operation provides a more precise modal interval result, since the fused operation may perform only a single "outer" digital rounding when providing the fused modal interval result, whereas performing the multiplication and addition (or subtraction) as two separate binary operations requires a second "outer" digital rounding for the second binary operation result.

Further utility of the ternary modal interval operation of FIG. 36 is that it avoids performing the unnecessary multiplication of the select two operands into a product when it is known that the remaining third operand is a decorated empty set; in this case the logic elements 51 produce the correct modal interval value in result register 25 without needing to perform the actual multiplication of the select two operands into a product prior to finding out if the remaining third operand is a decorated empty set or not.

What has been described and depicted herein are preferred, non-limiting embodiments of Applicant's subject matter, along with some advantageous adaptations thereof. Since the elements of the system disclosed herein, and methods practiced via the one or more contemplated systems, may be embodied in other specific forms without departing from the spirit or general characteristics thereof, some of which forms have been indicated, the embodiments described and depicted herein/with are to be considered in all respects illustrative and not restrictive. Accordingly, the scope of the subject invention is as defined in the language of the appended claims, and includes not insubstantial equivalents thereto.

What is claimed is:

1. Apparatus for calculating a result modal interval dependent on a first modal interval, a second modal interval and a third modal interval, the first modal interval defined by a first endpoint pair, the second modal interval defined by a second endpoint pair, the third modal interval defined by a third endpoint pair, the result modal interval defined by a result endpoint pair, each endpoint of the endpoint pair of each of the first, second, third and result modal intervals characterized by sign, fraction, and exponent bit fields, the apparatus comprising:

a. a first operand register for holding endpoints of the first endpoint pair of the first modal interval, and for providing a first operand signal specifying contents of the bit fields of the endpoints of the first endpoint pair of the first modal interval;

b. a second operand register for holding endpoints of the second endpoint pair of the second modal interval, and for providing a second operand signal specifying contents of the bit fields of the endpoints of the second endpoint pair of the second modal interval;

c. a third operand register for holding endpoints of the third endpoint pair of the third modal interval, and for providing a third operand signal specifying contents of the bit fields of the endpoints of the third endpoint pair of the third modal interval;

d. an analysis element for receiving the first, second and third operand signals and creating a first, second and third truth table pair, respectively, from the first, second and third endpoint pair, each truth table pair comprising a first and second truth table, respectively, for the first and second endpoint of the endpoint pair, each truth table including a sign bit (S) indicating the sign of the respective endpoint, a not-a-number bit (N) indicating whether the respective endpoint is Not-a-Number, an infinity bit (I) indicating whether the respective endpoint is infinity, and a zero bit (Z) indicating whether the respective endpoint is zero;

e. a classification element for determining a first classification from the first truth table pair, a second classification from the second truth table pair, and a third classification from the third truth table pair, each classification including an empty bit (E) and a tracking decoration (T), wherein:

i. when the truth table pair indicates the respective endpoints have the same sign and magnitudes of infinity, the empty bit is 1 and the tracking decoration indicates an empty or non-empty restriction;

ii. when the truth table pair indicates exactly one of the respective endpoints is not-a-number, the empty bit is 1 and the tracking decoration is the NaN decoration field from the not-a-number endpoint;

iii. when the truth table pair indicates both respective endpoints are not-a-number, the empty bit is 1 and the tracking decoration indicates a select restriction;

iv. otherwise, the empty bit is 0 and the tracking decoration is not used; and, f. providing a result signal encoding the result modal interval, wherein:

i. when the empty bit from the first classification is 1, the empty bit from the second classification is 1, and the empty bit from the third classification is 1, the result modal interval is a decorated empty set encoding the tracking decoration of minimum value from the first, second and third classification;

ii. when the empty bit from the first classification is 1, the empty bit from the second classification is 1, and the empty bit from the third classification is 0, the result modal interval is a decorated empty set encoding the tracking decoration of minimum value from the first and second classification;

iii. when the empty bit from the first classification is 1, the empty bit from the second classification is 0, and the empty bit from the third classification is 1, the result modal interval is a decorated empty set encoding the tracking decoration of minimum value from the first and third classification;

iv. when the empty bit from the first classification is 1, the empty bit from the second classification is 0, and the empty bit from the third classification is 0, the result modal interval is a decorated empty set encoding the tracking decoration of the first classification;

v. when the empty bit from the first classification is 0, the empty bit from the second classification is 1, and the empty bit from the third classification is 1, the result modal interval is a decorated empty set encoding the tracking decoration of minimum value from the second and third classification;

vi. when the empty bit from the first classification is 0, the empty bit from the second classification is 1, and the empty bit from the third classification is 0, the result modal interval is a decorated empty set encoding the tracking decoration of the second classification;

vii. when the empty bit from the first classification is 0, the empty bit from the second classification is 0, and the empty bit from the third classification is 1, the result modal interval is a decorated empty set encoding the tracking decoration of the third classification;

viii. when the empty bit from the first classification is 0, the empty bit from the second classification is 0, and the empty bit from the third classification is 0, the result modal interval is a result of a computation by a computational element receiving the first, second and third operand signals and the first, second and third truth table pairs.

2. The apparatus of claim 1, wherein the analysis element creates the truth tables dependent on a preselected exponent field bit configuration in each of the respective endpoints, and on a preselected fraction field bit configuration in each of the respective endpoints.

3. The apparatus of claim 1, wherein said computational element comprises a structure for computing a ternary modal interval operation.

4. The apparatus of claim 3 wherein said ternary modal interval operation is a fused modal interval operation.

5. The apparatus of claim 4 wherein said fused modal interval operation is a fused multiply-add modal interval operation.

6. The apparatus of claim 4 wherein said fused modal interval operation is a fused multiply-subtract modal interval operation.

7. The apparatus of claim 4 wherein said fused modal interval operation is a fused subtract-multiply modal interval operation.

8. The apparatus of claim 4 wherein said fused modal interval operation requires only a single outward digital rounding.

* * * * *